(12) United States Patent
Hoppmann et al.

(10) Patent No.: US 11,072,970 B2
(45) Date of Patent: Jul. 27, 2021

(54) INSULATING PROFILE, IN PARTICULAR FOR THE PRODUCTION OF WINDOW, DOOR, AND FACADE ELEMENTS, AND METHODS FOR THE PRODUCTION THEREOF

(71) Applicant: Ensinger GmbH, Nufringen, DE (US)

(72) Inventors: Severin Hoppmann, Stuttgart (DE); Wolfgang Paulus, Lam (DE); Susann-Marie Aubele, Stuttgart (DE); Roland Ellwanger, Gäufelden (DE); Matthias Rothfuss, Altensteig (DE); Michael Möller, Cham (DE); Axel Sehburger, Stuttgart (DE)

(73) Assignee: ENSINGER GmbH, Nufringen (DE)

(*) Notice: Subject to any disclaimer, the term of this patent is extended or adjusted under 35 U.S.C. 154(b) by 0 days.

(21) Appl. No.: 16/594,773

(22) Filed: Oct. 7, 2019

(65) Prior Publication Data

US 2020/0071986 A1    Mar. 5, 2020

Related U.S. Application Data

(63) Continuation of application No. PCT/EP2018/056742, filed on Mar. 16, 2018.

(30) Foreign Application Priority Data

Apr. 10, 2017  (DE) .......................... 102017107684.0

(51) Int. Cl.
  *E06B 3/263* (2006.01)
  *B29C 65/48* (2006.01)
  *E04B 1/74* (2006.01)
  *B29L 31/00* (2006.01)

(52) U.S. Cl.
  CPC ............ *E06B 3/2632* (2013.01); *B29C 65/48* (2013.01); *E04B 1/74* (2013.01); *B29L 2031/003* (2013.01)

(58) Field of Classification Search
  CPC ..... B29C 65/48; B29L 2031/003; E04B 1/74; E06B 3/2632
  See application file for complete search history.

(56) References Cited

U.S. PATENT DOCUMENTS

| 4,328,061 A | 5/1982 | Off et al. |
| 4,642,870 A * | 2/1987 | Schulz ................... E06B 3/273 29/509 |
| 5,658,408 A | 8/1997 | Frantz et al. |
| 6,035,596 A * | 3/2000 | Brunnhofer ......... E06B 3/26303 49/DIG. 1 |

(Continued)

FOREIGN PATENT DOCUMENTS

| DE | 28 23 430 A1 | 5/1979 |
| DE | 30 42 838 A1 | 6/1982 |

(Continued)

OTHER PUBLICATIONS

DE 102012009838 A1 Machine Translation (Year: 2020).*

(Continued)

*Primary Examiner* — James M Ference
(74) *Attorney, Agent, or Firm* — Leydig Voit & Mayer, Ltd.

(57) ABSTRACT

The invention proposes insulating profiles of a polymer material, and methods for producing the insulating profiles, are disclosed.

17 Claims, 21 Drawing Sheets

(56) References Cited

U.S. PATENT DOCUMENTS

| | | | | |
|---|---|---|---|---|
| 6,035,600 A * | 3/2000 | Habicht | ............ | E06B 3/26305 52/717.02 |
| 6,339,909 B1 * | 1/2002 | Brunnhofer | ......... | E06B 3/66319 52/786.13 |
| 6,803,083 B2 * | 10/2004 | Ensinger | ............ | E06B 3/26301 428/188 |
| 6,986,934 B2 * | 1/2006 | Chen | .................... | B29C 65/564 428/195.1 |
| 7,913,470 B2 | 3/2011 | Siodla et al. | | |
| 8,176,709 B2 * | 5/2012 | Siodla | ................ | E06B 3/26303 52/800.13 |
| 9,920,568 B2 * | 3/2018 | Rethmeier | .......... | E06B 3/26343 |
| 10,207,443 B2 * | 2/2019 | Krohmer | ................ | B29C 43/06 |
| 2002/0014046 A1 * | 2/2002 | Korn | ................... | E04D 13/1415 52/287.1 |
| 2005/0183351 A1 * | 8/2005 | Brunnhofer | ......... | E06B 3/26305 52/204.5 |
| 2006/0260229 A1 * | 11/2006 | McKinlay | ................. | E06B 3/22 52/204.593 |
| 2007/0245664 A1 * | 10/2007 | Orologio | ................ | B32B 27/06 52/508 |
| 2008/0086973 A1 * | 4/2008 | Hallenstvet | ........... | E06B 3/2632 52/656.6 |
| 2010/0018140 A1 * | 1/2010 | Brunnhofer | ......... | E06B 3/26303 52/204.71 |
| 2010/0115850 A1 * | 5/2010 | Siodla | ................ | E06B 3/26305 49/493.1 |
| 2011/0236641 A1 * | 9/2011 | Brambrink | .............. | B29C 66/71 428/166 |
| 2011/0296796 A1 * | 12/2011 | Lenhardt | ............. | E06B 3/66342 52/786.13 |
| 2013/0212957 A1 * | 8/2013 | Cempulik | ................ | E04C 1/42 52/172 |
| 2015/0152635 A1 * | 6/2015 | Duforestel | ................ | E04B 1/80 52/794.1 |
| 2015/0159422 A1 * | 6/2015 | Pettit, III | .............. | E06B 3/2632 52/204.591 |
| 2015/0306854 A1 * | 10/2015 | Frueh | ....................... | C08L 77/02 428/474.9 |
| 2015/0308181 A1 * | 10/2015 | Wagner | ..................... | E06B 3/30 52/656.2 |
| 2016/0024799 A1 * | 1/2016 | Pollack | ............... | E04D 13/1625 52/302.1 |
| 2017/0089120 A1 * | 3/2017 | Moller | ...................... | E06B 3/64 |
| 2017/0320301 A1 * | 11/2017 | Dederichs | .............. | B32B 27/18 |
| 2017/0334564 A1 | 11/2017 | Born et al. | | |
| 2017/0349749 A1 * | 12/2017 | Dederichs | ............... | C08L 77/06 |
| 2019/0085618 A1 * | 3/2019 | Al Kassas | ................ | E06B 3/56 |
| 2019/0119973 A1 * | 4/2019 | Hatzky | ............... | E06B 3/26303 |
| 2020/0071986 A1 * | 3/2020 | Hoppmann | ........... | E06B 3/2632 |
| 2020/0109592 A1 * | 4/2020 | Karl | ................. | B29C 66/81425 |

FOREIGN PATENT DOCUMENTS

| | | |
|---|---|---|
| DE | 195 28 498 C1 | 6/1996 |
| DE | 195 11 081 A1 | 9/1996 |
| DE | 296 21 419 U1 | 2/1997 |
| DE | 10 2010 064 034 A1 | 6/2012 |
| DE | 20 2012 010 135 U1 | 11/2012 |
| DE | 10 2012 009 838 A1 | 11/2013 |
| DE | 20 2010 018 272 U1 | 3/2015 |
| DE | 10 2014 103 729 A1 | 9/2015 |
| DE | 10 2016 208 650 A1 | 11/2017 |
| EP | 1 347 141 A1 | 9/2003 |
| EP | 2 256 280 A2 | 12/2010 |
| EP | 2 432 960 A1 | 3/2012 |
| EP | 2 527 580 A1 | 11/2012 |
| WO | WO 2011/012293 A1 | 2/2011 |
| WO | WO 2013/170952 A1 | 11/2013 |
| WO | WO 2014/063812 A1 | 5/2014 |
| WO | WO 2015/189348 A1 | 12/2015 |

OTHER PUBLICATIONS

German Patent & Trademark Office, Search Report in counterpart German Priority Application No. 10 2017 107 684.0, dated Feb. 27, 2018.

International Search Authority, International Search Report in counterpart International Patent Application No. PCT/EP2018/056742, dated May 14, 2018.

International Search Authority, International Written Opinion in counterpart International Patent Application No. PCT/EP2018/056742, dated May 14, 2018.

International Search Authority, International Preliminary Report on Patentability in counterpart International Patent Application No. PCT/EP2018/056742, dated Oct. 24, 2019.

* cited by examiner

FIG. 5
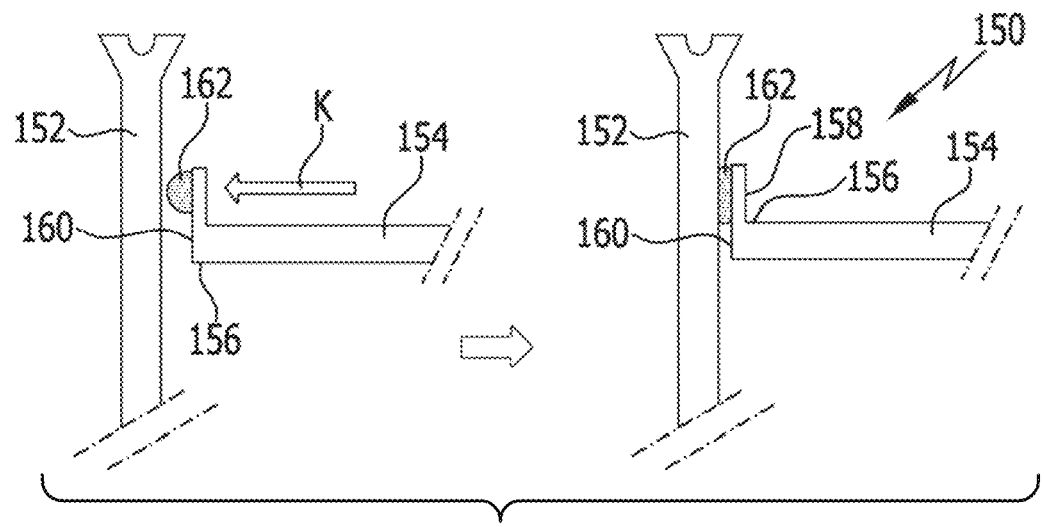
FIG. 5A
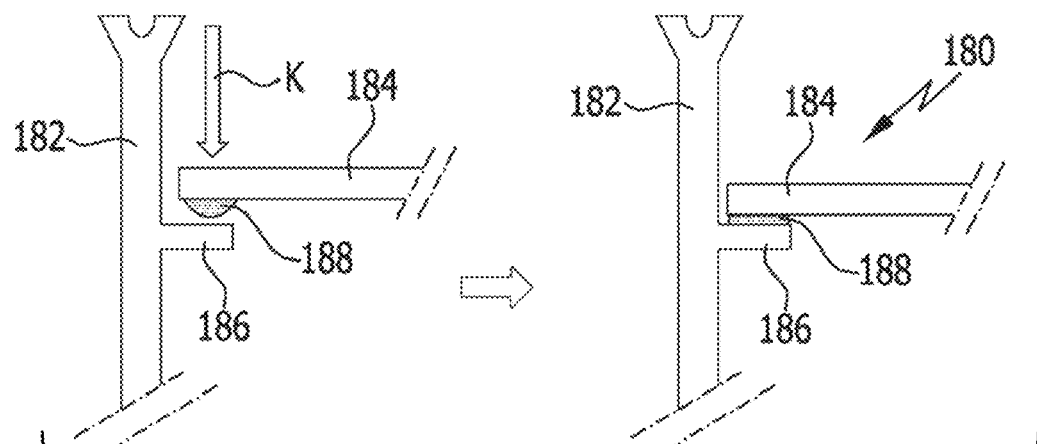
FIG. 5B
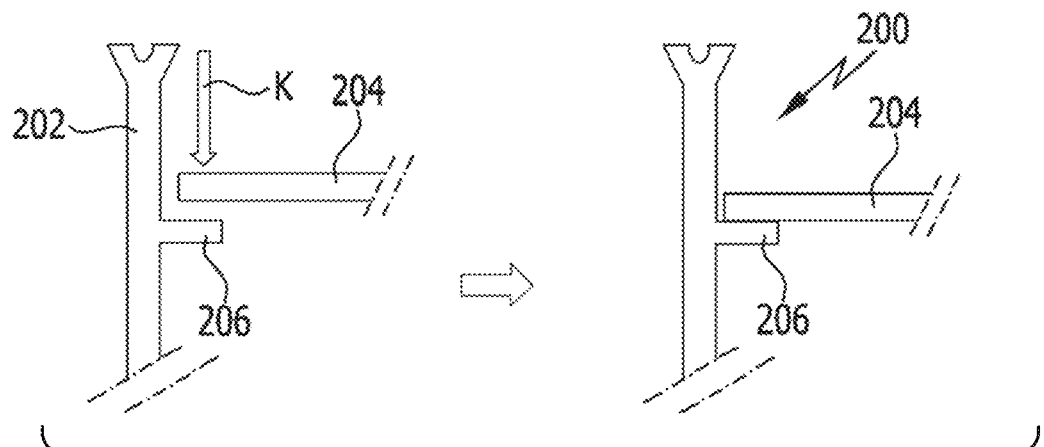
FIG. 5C

FIG.6-1
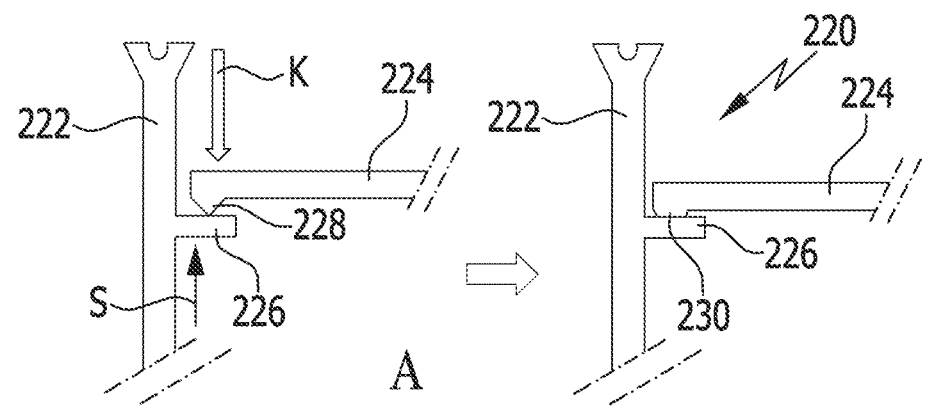
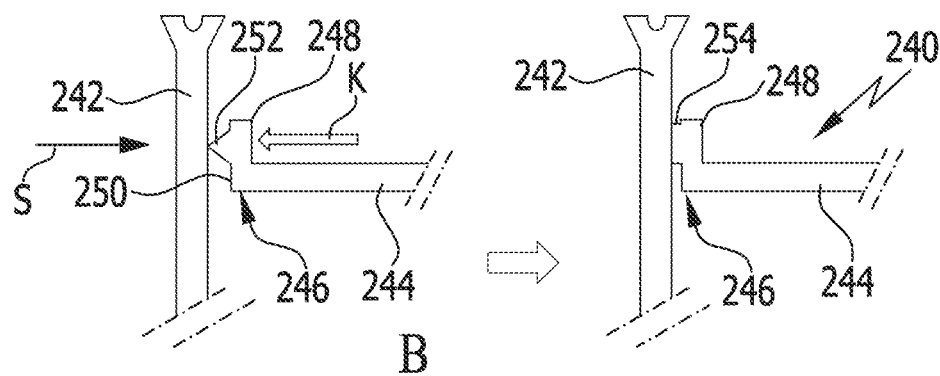
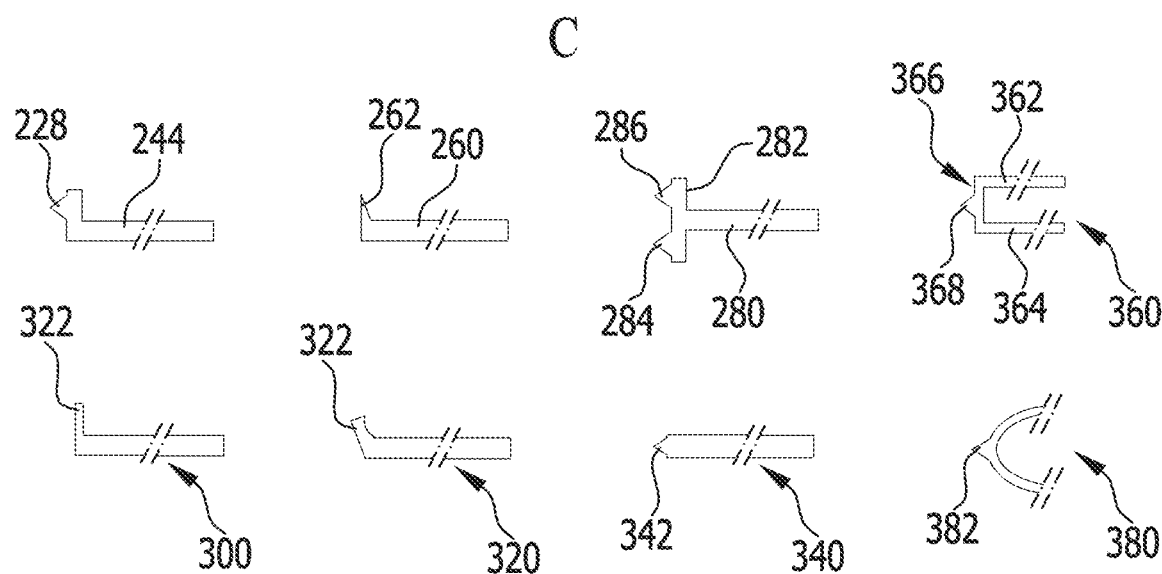

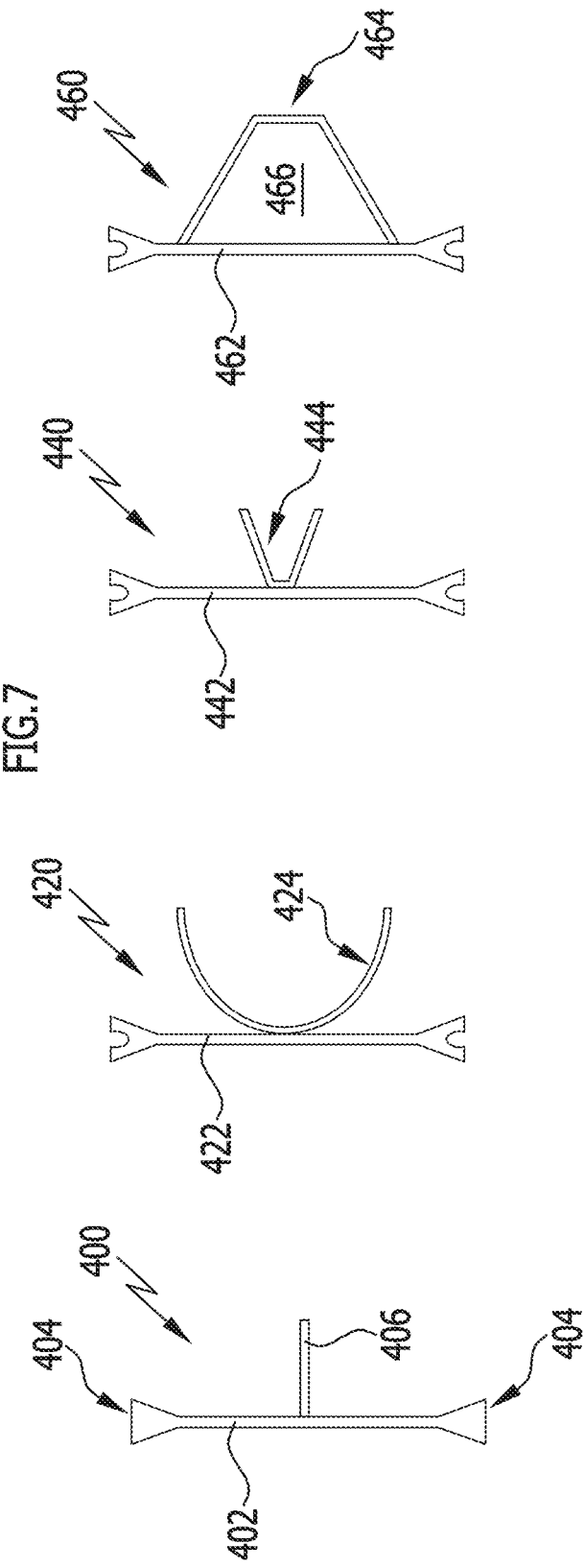
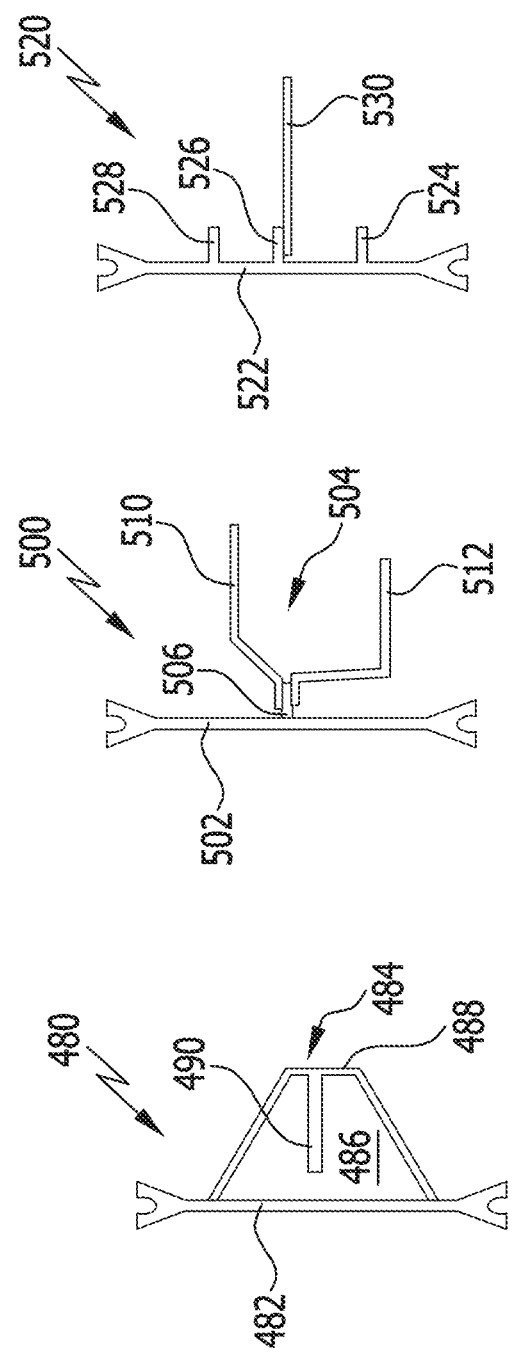
FIG. 7

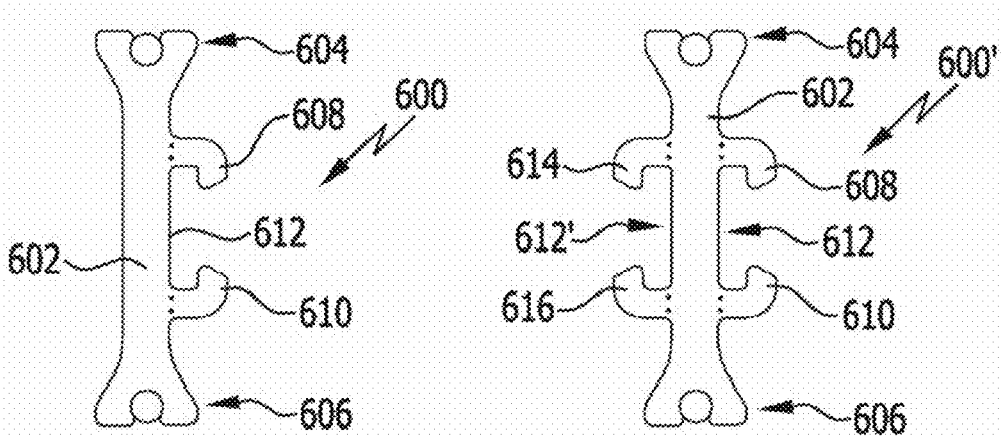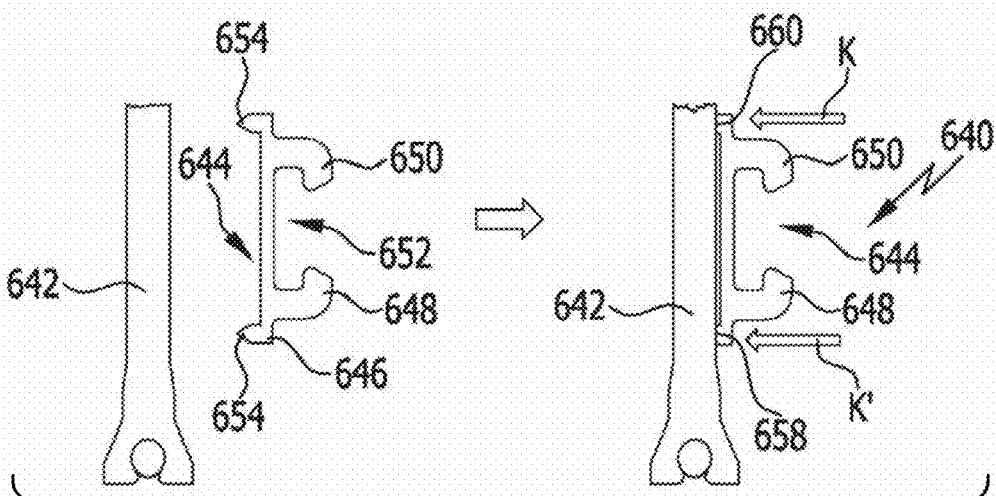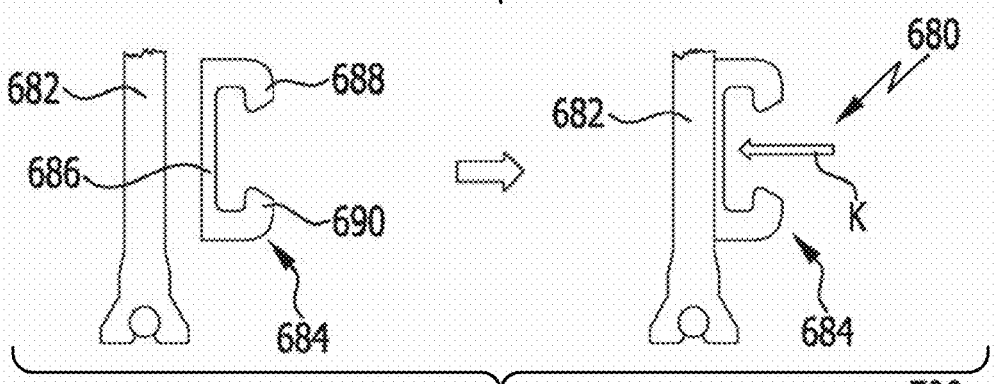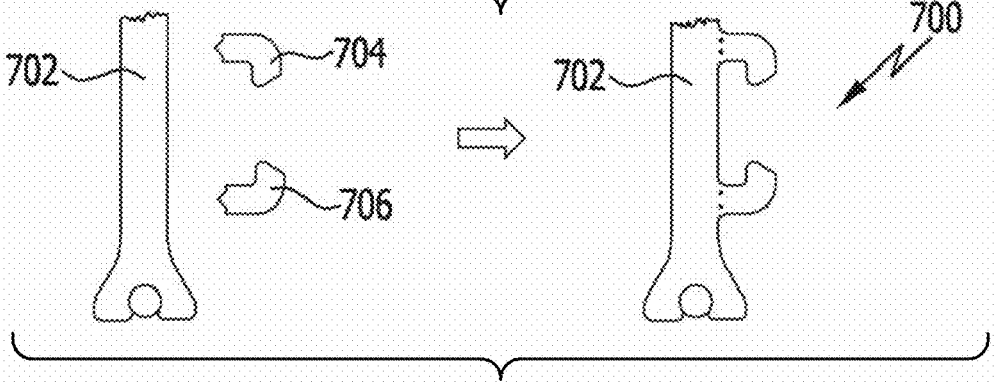
FIG. 9

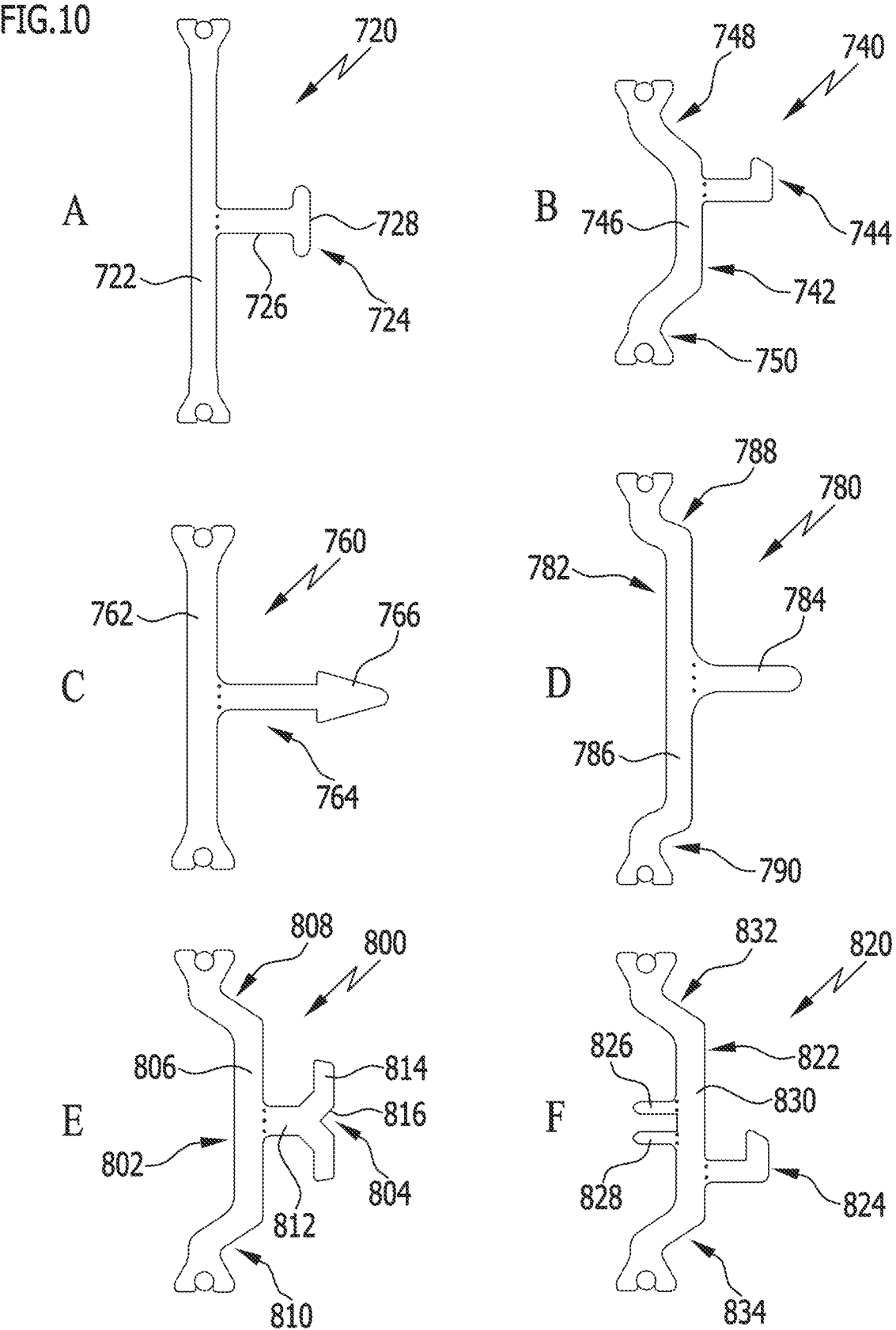

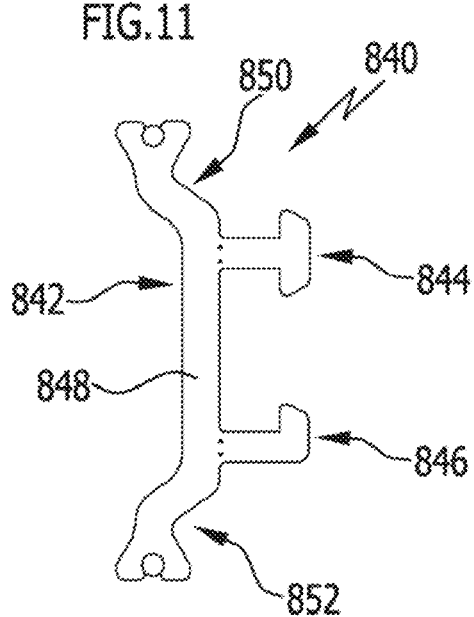
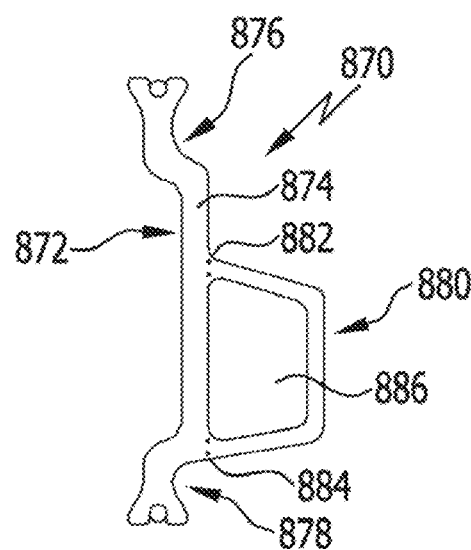
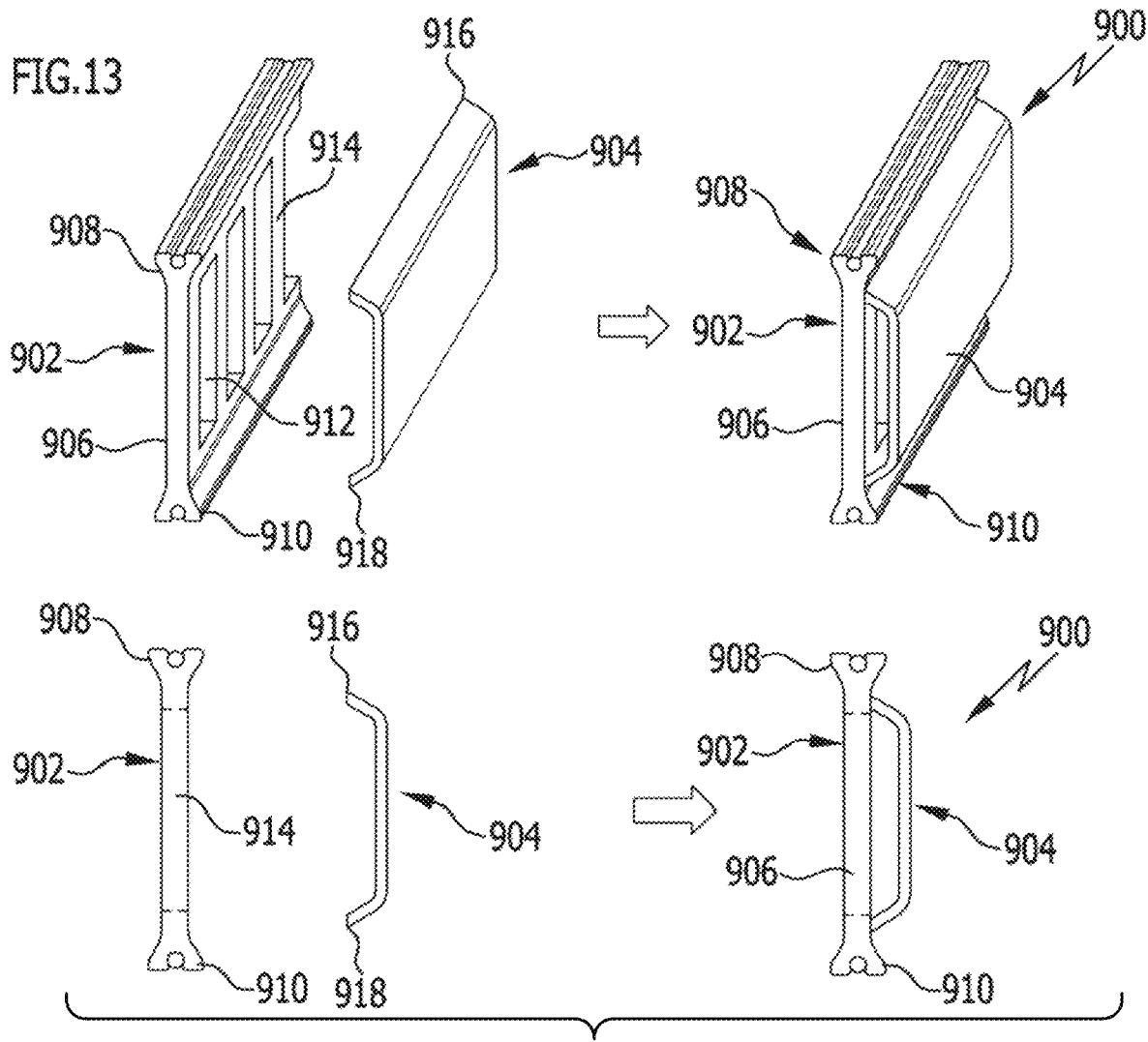

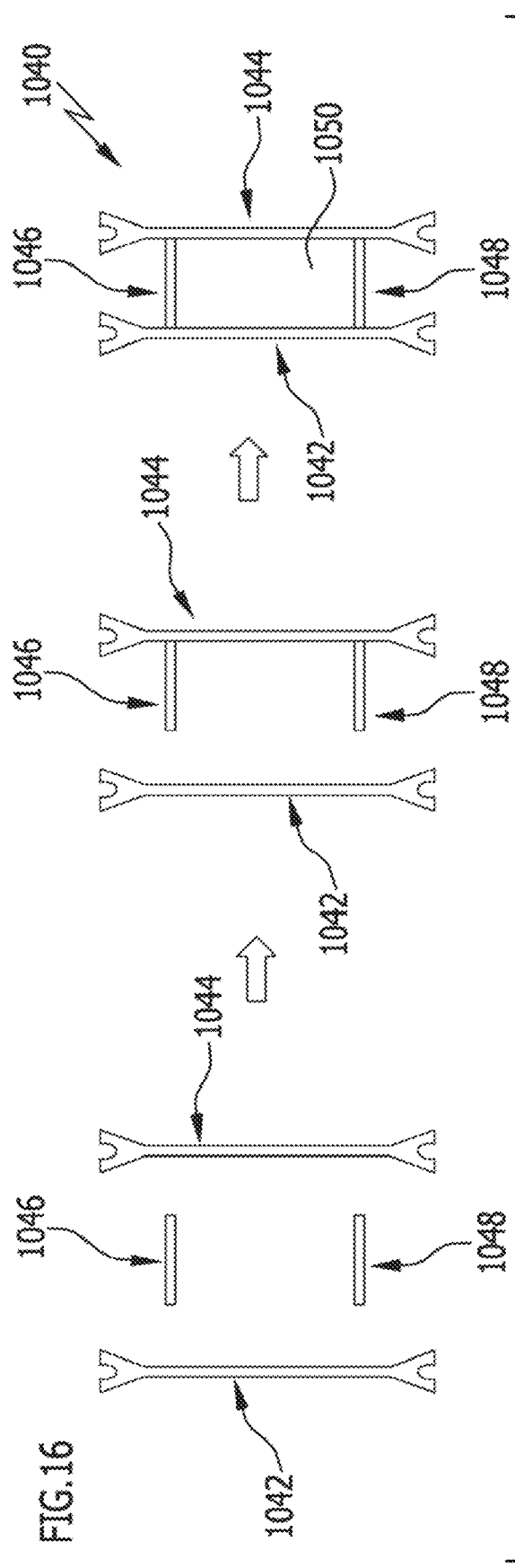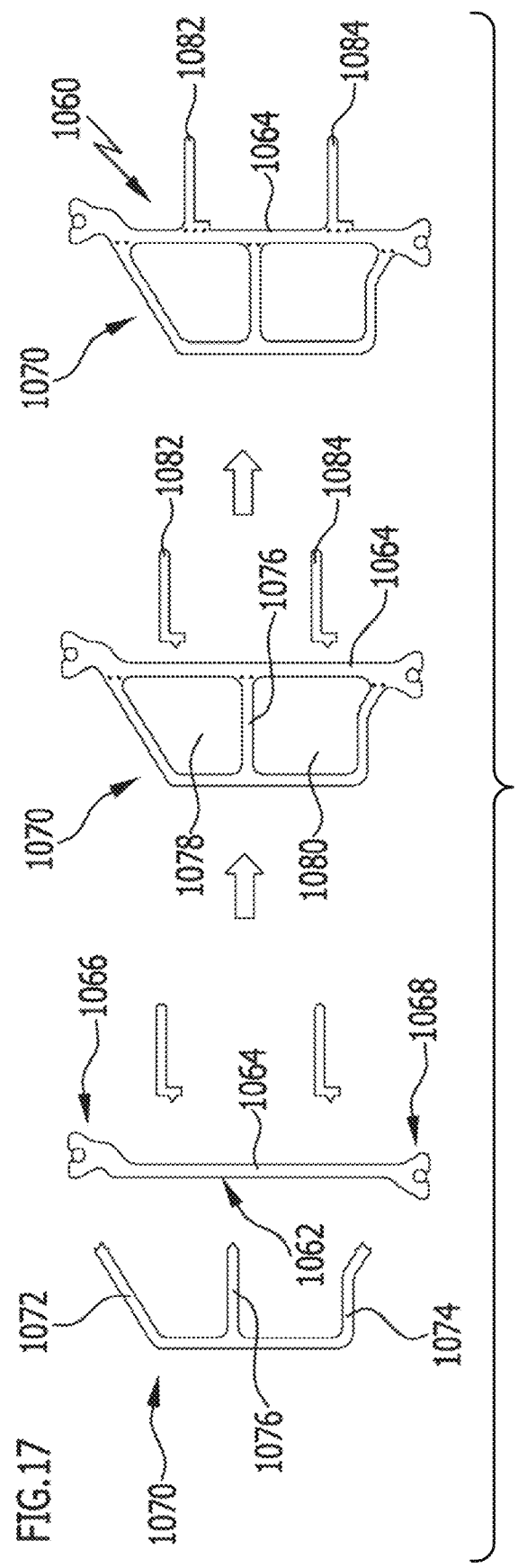

FIG.18
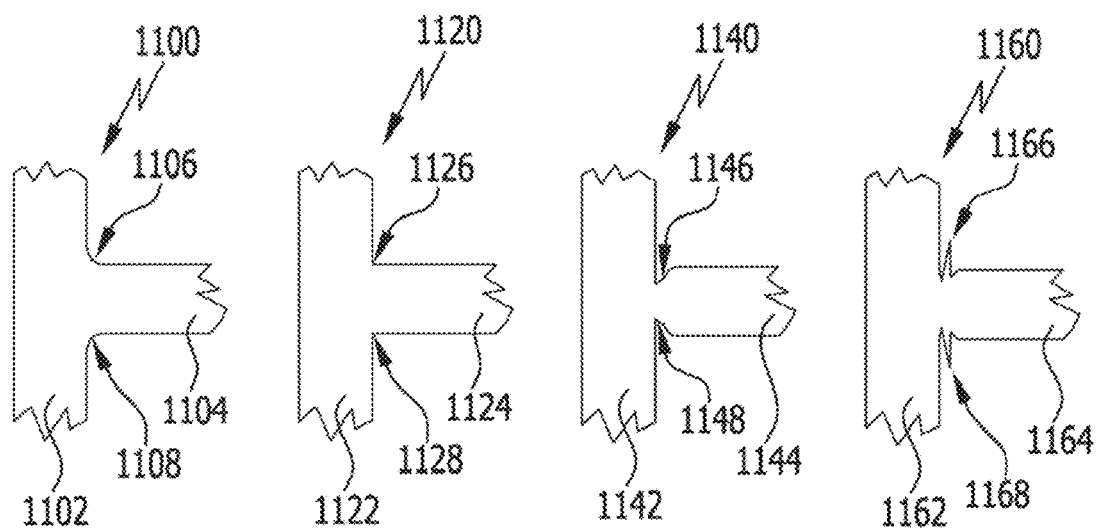
FIG. 18A    FIG. 18B    FIG. 18C    FIG. 18D
FIG.19
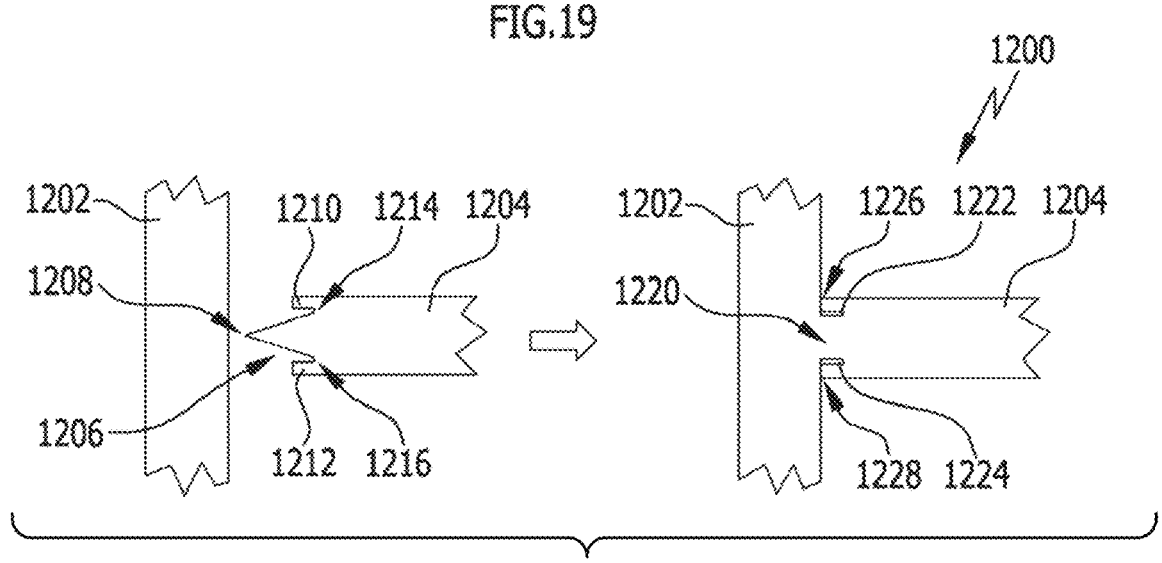

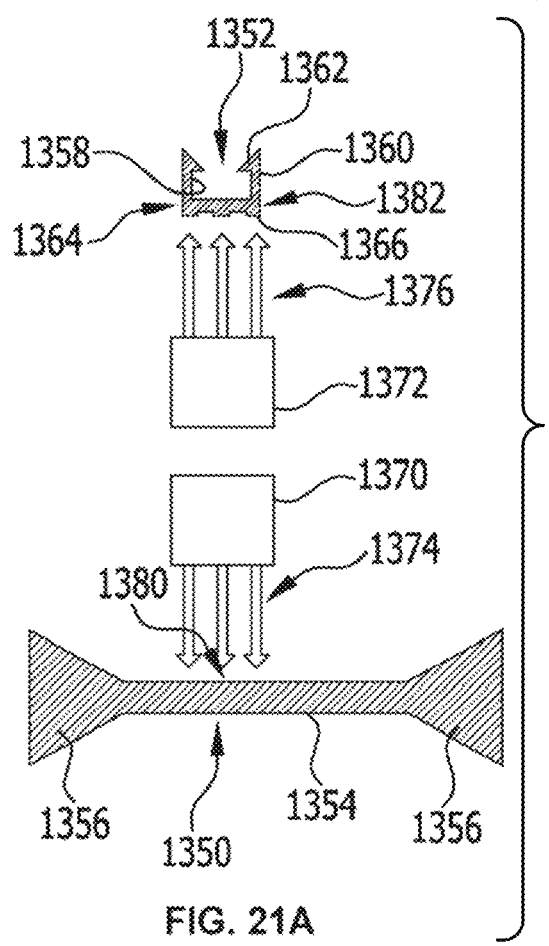
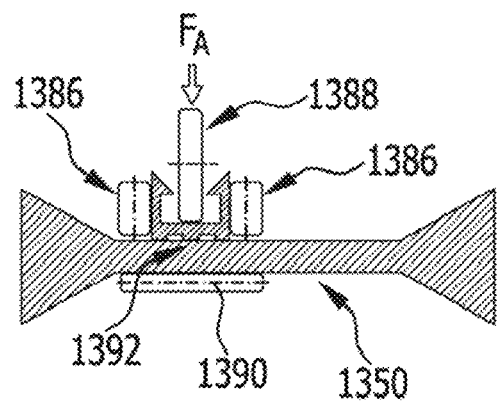
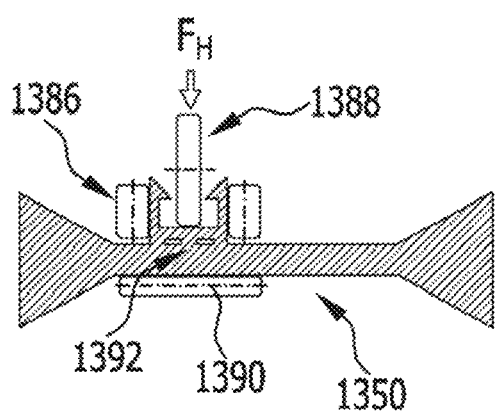
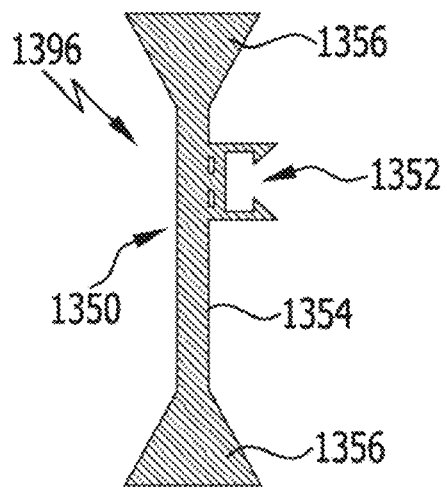
FIG. 21
FIG. 21A
FIG. 21B
FIG. 21C
FIG. 21D

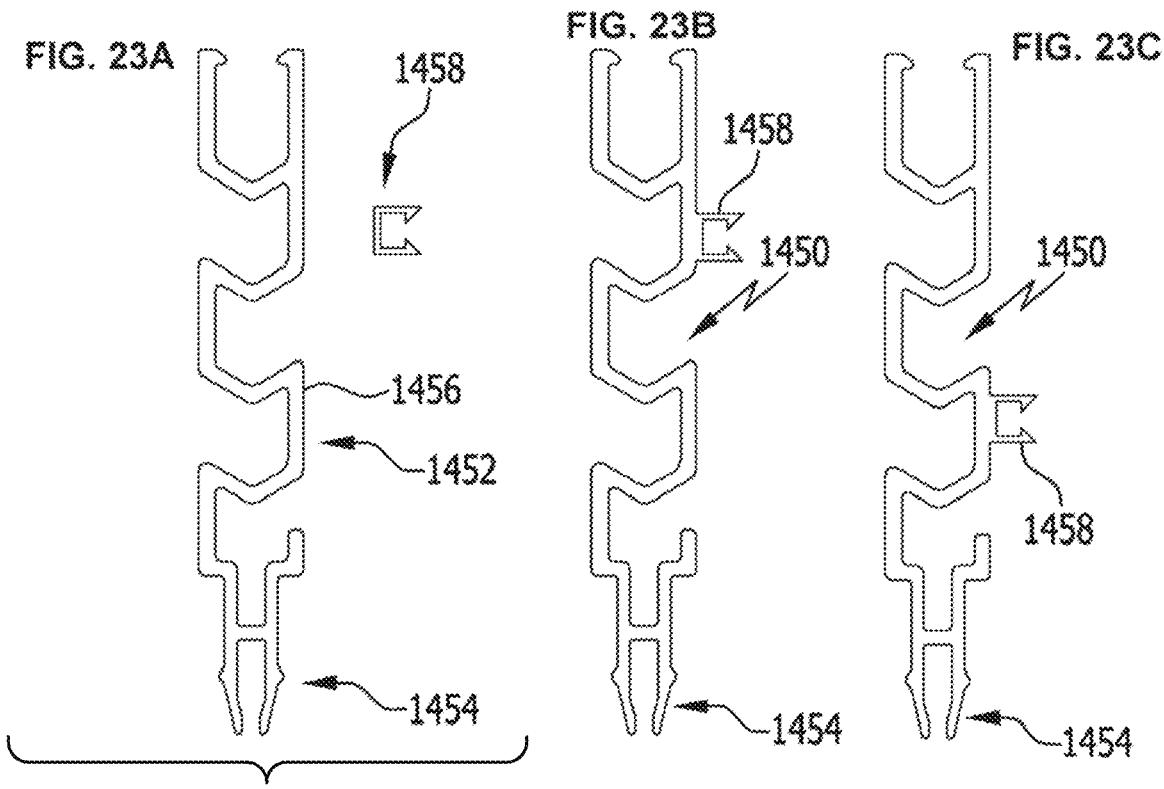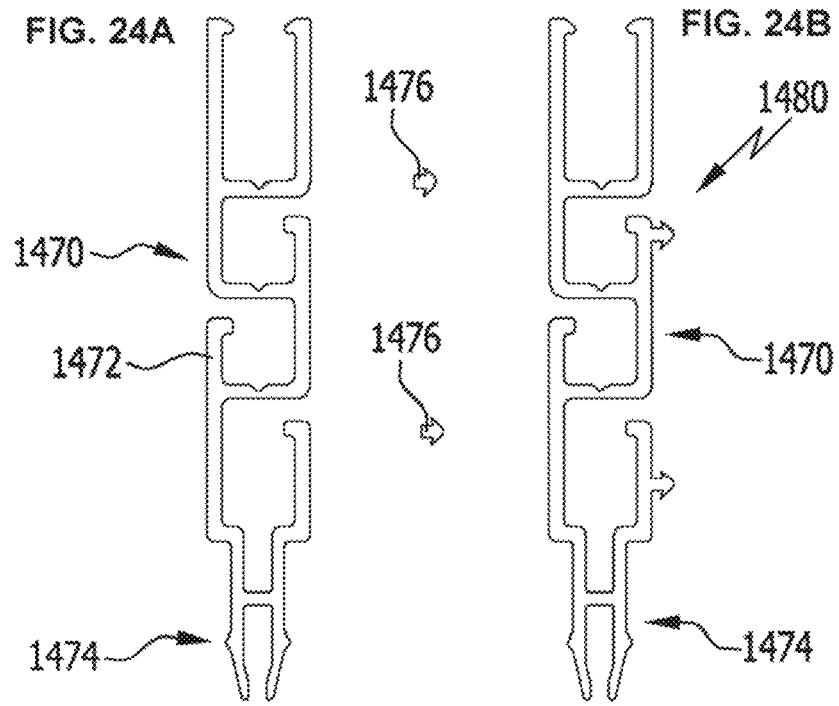

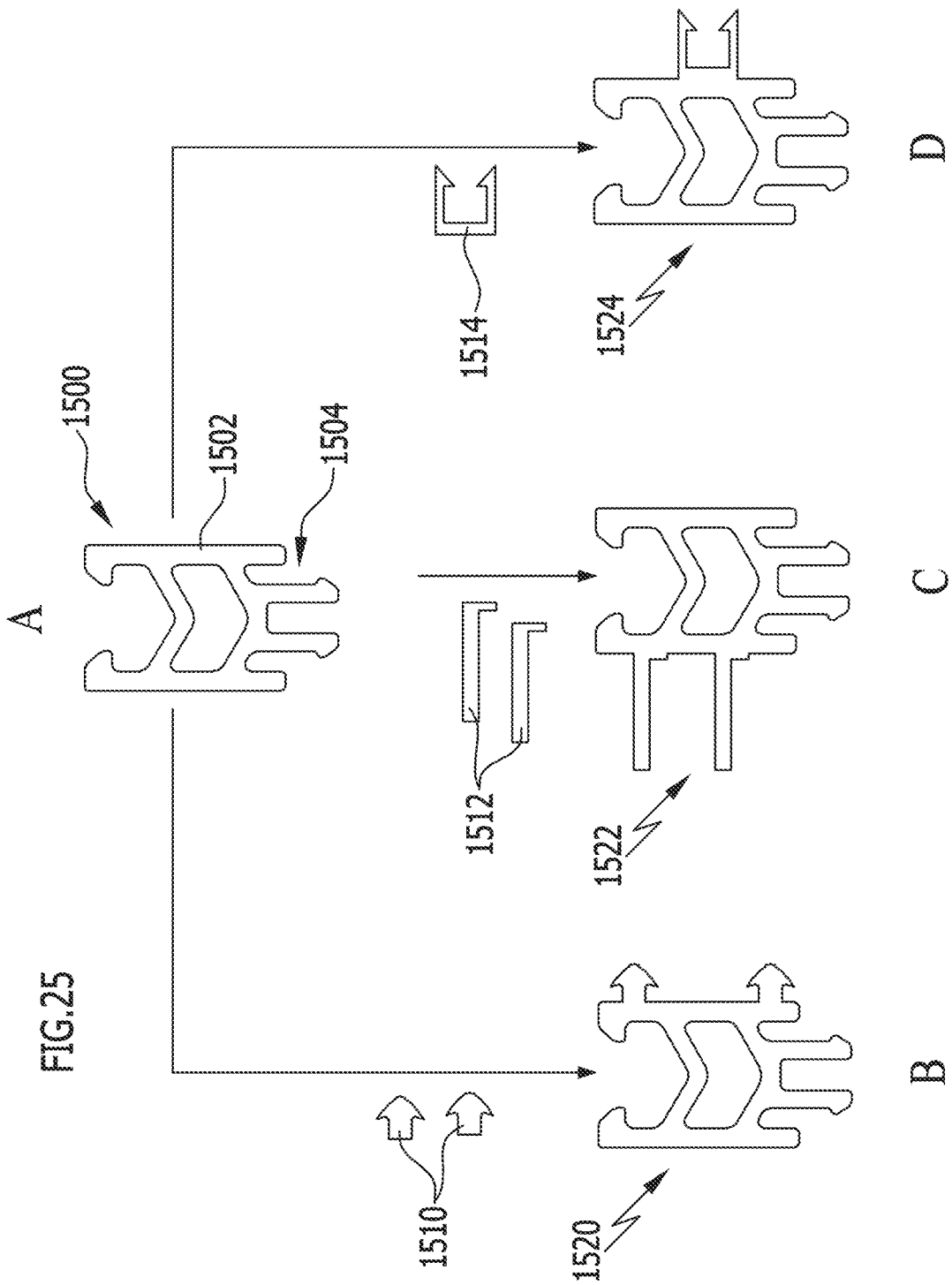

INSULATING PROFILE, IN PARTICULAR FOR THE PRODUCTION OF WINDOW, DOOR, AND FACADE ELEMENTS, AND METHODS FOR THE PRODUCTION THEREOF

CROSS-REFERENCE TO RELATED APPLICATIONS

This patent application is a continuation of International Patent Application No. PCT/EP2018/056742, filed on Mar. 16, 2018, which claims the benefit of German Patent Application No. 10 2017 107 684.0, filed on Apr. 10, 2017, which are incorporated herein by reference.

BACKGROUND OF THE INVENTION

The invention relates to insulating profiles of a polymer material, in particular for the production of window, door, and facade elements, and to methods for the production of the insulating profiles. The insulating profiles are used in particular in a variety of ways in the production of metal-plastic composite profiles, wherein the insulating profiles serve for the thermal and/or acoustic insulation of the composite profiles and typically connect two metal profiles to each other. The insulating profiles in accordance with the invention are used furthermore as so-called chicanes, which function as sills, for example in sliding systems for large-format windows or doors. Finally, the insulating profiles in accordance with the invention are suitable as facade spacers which are used in particular to keep adjacent glass panes or other facade panels in facades and glass roof constructions at a distance from each other and optionally to fill the gap present between them.

Until now, the insulating profiles mentioned hereinabove have usually been manufactured in accordance with the special geometrical requirements of the customers. To this end, high-priced extruding tools are made utilising complex methods with which the sought-for contours of the insulating profile demanded by the customer can then be produced exactly.

A further disadvantage of this classical method is, in addition to the high tool costs, the lacking flexibility to react to certain desired changes with regard to adaptations of the composite geometry. Thus for example, one cannot simply increase the visible width of the metal-plastic composite while maintaining the insulating profile without losing out on the insulating effect.

In the prior art, this problem is addressed by various approaches.

It should generally be noted that insulating profiles of that kind constitute safety-related components, which in Germany, for example, are tested for suitability according to DIN EN 14024.

Insulating profiles are known in which foam bodies are subsequently applied. The latter are hereby secured to the insulating profile either by material bond or by positive fit. For example, EP 1 347 141 A1 describes an insulating profile that is combined with foam strips of different heights.

DE 10 2010 064 034 A1 also describes metal-plastic composite profiles which are optimized in their properties using subsequently applied foam material.

There are further solutions on the market that differ on the basis of the variety of the possible insulating foams. In some cases, high demands are made on said foams, in particular when the foams in the profile composite undergo the process step of "powder coating". There are only few foam technologies which withstand the diverse chemical pretreatment baths and a subsequent temperature load upon baking when coating of over 200° C. These foams should hereby have a low thermal conductivity, be inexpensive, and be environmentally friendly and recyclable. To date, no system has emerged which fulfills all of these requirements.

Another approach is the application of functional elements in the form of flags or the subsequent formation of hollow chamber structures, for example by polymeric or metallic materials.

It is known from DE 296 21 419 U1 that insulating profiles may be variably produced by clipping a U-shaped profile onto a base profile. These insulating profiles may be easily adapted in order to optimize the profile composite with regard to the insulating effect. A disadvantage of this method, though, is the necessity of so-called fastening catches on the base profile for the production of the clip connection, wherein said catches also invariably fix the fastening position of the hollow chamber to be formed.

DE 195 28 498 A1 and the application DE 10 2012 009 838 A1 based on the prior publication describe a possibility of producing composite profiles by flags being subsequently applied to an insulating profile/base profile.

DE 195 28 498 A1 describes for this purpose injected or co-extruded flags, for example of polyamide or polyester materials, as well as metallic flags. However, it cannot be concluded from these publications how a metallic flag can be permanently fixedly attached without significantly degrading the thermal insulating effect and the mechanical properties, specifically the transverse tensile strength, for example according to DIN EN 14024.

DE 10 2012 009 838 A1 describes an insulating profile with a flag structure which has a plurality of insulated hollow chambers which run in parallel, wherein the flag may be produced of a plastic film material, for example.

Due to the thin wall thicknesses of film materials in combination with the described hollow chamber structure, products of that kind are clearly disadvantageous in case of fire in comparison with other solutions. The application of the flag takes place, e.g., by adhesion or welding. Free-standing thin plastic films also have the disadvantage that they are easily bendable. In transporting and in storing products of that kind in a transport container, it is thus probable that flags made of free-standing foils buckle under the dead weight of the profiles, bend, and permanently deform. This scenario represents a typical criterion for rejection.

A composite profile having insulating profiles of plastic and having a bridging, heat-insulating metallic transverse flag is described in DE 195 11 081 A1.

A composite profile is described in EP 2 527 580 A1 in which the function of a transverse flag is achieved by a separate profile which is fastened to one of the metal shells of the composite profile.

The lengthening of flags in the case of insulating profiles by means of adapters is to be found described in, e.g., EP 2 432 960 A1. However, one recognizes solely on the basis of the cross sectional areas of the profile geometries described and shown that this solution can be achieved only with a high use of material.

Insulating profiles with the function as spacers for facade elements are known in a wide variety, for example from WO 2015/189348 A1.

All these variants described are not completely satisfying, which is why the object arises to propose an improved insulating profile which takes the stated problems and requirements into account.

BRIEF SUMMARY OF THE INVENTION

This object is solved in accordance with the invention by an insulating profile in accordance with claim 1 and a method for the production thereof in accordance with claim 19.

In accordance with the invention, first an insulating bar is produced with a profile body (or optionally a plurality of profile bodies) and at least one rim section formed onto the profile body—subsequently also referred to as base body—wherein one or more first functional elements, for example in the form of so-called flags and/or other functional parts, are subsequently materially bonded to the insulating bar. Likewise, the functional elements are frequently also produced of a polymer material.

The material bond may be, in accordance with the invention, effected in a variable position along and/or transverse to the profile cross section or at a predetermined position. The connection of the profile body to the first functional element or functional elements may be effected continually, i.e., in particular continuously, or in points or in sections at distances at a plurality of consecutive positions.

The insulating bar is often configured with two rim sections which are formed onto the profile body opposite each other perpendicular to the longitudinal direction of the insulating profile.

Moreover, the insulating bar may have two or more profile bodies, wherein in total at least one rim section is formed onto one of the profile bodies.

The wall thickness of the profile body of the insulating profile in accordance with the invention is often about 0.6 mm to about 2.5 mm, preferably about 0.7 mm to about 2 mm. It may also be thicker, though, in particular applications.

The first functional elements preferably extend noticeably away from the surface of the profile body or the rim section (in perpendicular direction), for example about 3 mm or more.

The first functional elements often have wall thicknesses in the range of about 0.6 mm to about 2 mm or even more, depending on the function assigned to the first functional element.

The functions of the first functional elements are in particular the transmission of forces, the accommodation of sealing elements, for example elastomer sealing elements, the function of a so-called flag, i.e., a structural element for subdividing cavities to reduce or suppress convection currents and more. The form of the functional elements may then contain or take on the form of flags, hooks, catches, grooves, T-shaped projections, arrows, among other things.

The functional elements are then preferably made of a material, in particular a polymer material, with an E-modulus of, e.g., about 2000 MPa or more, preferably about 3000 MPa or more, and/or a tensile strength of about 40 MPa or more.

The connection of the first functional elements to the insulating bar may take place directly, optionally at a projection formed on the insulating bar, or indirectly by means of assembly elements, wherein the assembly elements are then first materially fixed to the insulating bar, in particular on the profile body/bodies thereof, and then the functional element or functional elements are connected to the assembly element.

As a result, the insulating profiles may, on the one hand, be produced economically with regard to the raw materials, and on the other hand the variety of raw material does not need to be unnecessarily increased. This results in advantages for the client with respect to the economic efficiency and the technical performance, and the insulating profiles are easy to process and are reliable in application. The processing of the profiles hereby comprises in particular

- transporting and storage (e.g., loosely or bundled in a transport container for bar-type goods);
- cutting, sawing, and milling, for example to cut profiles to length, to chamfer them, to perforate them, or to tailor them appropriately for an application;
- conditioning to control moisture content or to set certain storage and aging states;
- carrying out cleaning and pre-treatment steps, e.g., with aqueous dispersions, solutions or solvents, or chemicals in particular in preparation for coating processes (painting, adhesion, etc.);
- carrying out coatings, in particular paintings, for example powder coating baking at temperatures of up to 200° C. or up to 220° C.; and
- the application or attachment of foams or foamed materials.

In particular hereby, insulating profiles with highly accurate dimensions, i.e., small tolerances, and in particular high parallelism of the individual components of the insulating profile can be produced. This makes processing the insulating profiles to composite profiles considerably easier.

The polymer material of the insulating bar is preferably a thermoplastic or thermosetting material. The polymer may, in addition to one or a plurality of polymers, also comprise reinforcing materials, in particular fibers, particularly preferably in the form of glass fibers, other fillers, additives, colorants, etc.

The fiber-reinforced polymer materials preferably contain reinforcing fibers with a proportion of about 5 to about 60% by weight, further preferably with a proportion of about 20 to about 50% by weight. This applies in particular to the polymer material of the profile body of the insulating profile in accordance with the invention.

The rim section or the rim sections may be formed and arranged in different configurations in relation to the profile body. For example, they may extend substantially in parallel to a plane of the profile body or be formed offset in relation to a plane of the profile body.

Preferred insulating profiles in accordance with the invention according to a first variant have a profile body with a region which extends in the longitudinal direction of the insulating profile and is of substantially planar configuration. The profile body or bodies may optionally be of planar configuration as a whole.

According to a further variant, the insulating profiles in accordance with the invention have a profile body, in particular with two rim sections, which profile body has in a region, optionally between the rim sections, raised portions and recessed portions which are arranged following each other in the longitudinal direction at predetermined, in particular regular distances and which thus form a sort of wave structure. The raised portions and recessed portions preferably extend substantially over the entire width of the profile body.

Furthermore, the insulating profile in accordance with the invention may have a profile body which has through openings at predetermined, in particular regular distances, which preferably extend transversely to the longitudinal direction of the insulating profile.

In some preferred embodiments of the invention, the insulating profiles have at least one of the rim sections equipped with a connecting element which may be configured in particular in the form of a roll-in head.

Further preferable are insulating profiles in accordance with the invention in which the functional element or functional elements are materially bonded to the profile body and/or the rim sections of the insulating bar, wherein the material bond is preferably produced free of auxiliary material. If assembly elements are used for the connection of the functional elements, these too are connected to the insulating bar and the profile body thereof, respectively, and/or to the rim sections thereof, preferably free of auxiliary material.

In this case, in particular the first functional element or functional elements may be materially bonded to the profile body and/or the rim sections of the insulating bar, wherein the material bond is produced by melting or superficially melting the profile body and/or the first functional elements. With this technique, it is ensured that the mechanical strength of the connection of the first functional elements to the profile body and/or the at least one rim section has a strength that allows for a simple and secure handling of the insulating profiles during transport and processing. Likewise, the connection must be sufficiently long-lasting in order to function in the area of use of the product over the life cycle. This is familiar to the person skilled in the art. The connection should, for example, have a strength of at least 2 N/mm, preferably at least 5 N/mm, particularly preferably at least 10 N/mm. This strength is, for example, measured by means of a tensile test in which a base profile of a certain length (gives the reference length of the strength in [mm]) of the insulating profile is fixed and a normal force, or in certain cases a tangential force, is applied to the functional element, said force being increased until failure of the sample (breaking force in [N])

Depending on the polymer material or polymer materials used for the insulating bar and optionally the first functional elements, the melting or superficial melting in the contact region of the components may take place in particular at a temperature of about 95° C. or more, preferably about 150° C., further preferably about 200° C., particularly preferably about 250° C. or more These temperatures are important in particular in the contact or joining region of the components to be connected, i.e., the profile body, rim sections, and first functional elements.

The temperature to be selected is preferably above the melting or a softening temperature of a polymer material, in particular about 10° C. or more, further preferably about 20° C. or more above said temperatures. The relevant melting point, if not known, can be determined by calorimetric measurements. A softening temperature may typically be taken from technical data sheets and tables of materials or they may be determined, e.g., according to a Vicat method, in particular according to DIN EN ISO 306 for identifying the Vicat softening temperature.

Alternatively, the first functional element or functional elements may be materially bonded to the profile body and/or the rim section or rim sections of the insulating bar, wherein the material bond is produced using an auxiliary material, preferably a chemically cross-linking auxiliary material, for example an adhesive in particular of a reactive adhesive system, and wherein the material bond is further preferably configured to be not meltable.

In this case, it is preferable that the auxiliary material is processable at room temperature or a higher temperature.

Alternatively, a meltable auxiliary material (e.g., hotmelt or another polymer that is compatible with the polymer material of the insulating profile) may be used which has a softening temperature and/or a processing temperature of about 95° C. or more, preferably about 150° C. or more, further preferably 200° C. or more, and most preferably about 220° C. This auxiliary material may be chemically treated in such a way that it subsequently cross-links after application in softened or melted form (e.g., so-called reactive hotmelt systems).

According to a further alternative in accordance with the invention, the first functional element or functional elements may be materially bonded to the profile body and/or the rim sections of the insulating bar, wherein the material bond is effected by locally dissolving or superficially dissolving the profile body and/or the first functional element or functional elements with a solvent and/or the bond is produced using a dissolved polymer.

The concept of the present invention makes it possible, furthermore, to produce insulating profiles in which the insulating bar comprises second and optionally further functional elements that are integrally formed with the profile body, in addition to the first functional element or functional elements.

In accordance with the invention, the first functional elements may in particular be selected from sheet-type elements which are of planar, arcuate, in particular part-circular, branched, or angled configuration in cross section and/or elements enclosing one or a plurality of cavities. The cavities may thereby be configured as closed cavities, as required. In particular, the first functional elements may have a part-cylindrical geometry.

Depending on requirements, an insulating profile in accordance with the invention may be provided with first functional elements which form a multiplicity of, optionally closed, cavities in the longitudinal direction of the insulating profile, wherein the cavities may be configured in particular to be lined up.

Moreover, an insulating profile in accordance with the invention may have first functional elements, wherein the first functional element or functional elements of the insulating profile, seen in the longitudinal direction of the insulating profile, have adjoining wall sections which are angled to each other and are aligned preferably substantially perpendicularly to the profile body. For example, a configuration with a zig-zag geometry of the first functional element or functional elements may thus be formed.

Preferred are insulating profiles in accordance with the invention, in which the first functional element or functional elements are produced of a polymer material, preferably on the basis on a thermoplastic polymer. Often a thermoplastic polymer forms the main component of the polymer material. Further components of the polymer material may be selected in particular from reinforcing materials (e.g., glass, carbon, mineral, polymer fibers), fillers (glass in the form of glass powder or balls or hollow balls, chalk, talcum, wood flour, silicates, in particular layered silicates or amorphous silica), additives (e.g., stabilizers, glidants and lubricants, softeners, impact modifiers, thermal and heat stabilizers, flame retardants, couplers, cross-linkers), colorants (e.g., colorants or pigments), other polymers (e.g., in the case of polymer blends), etc.

The polymer material of the functional elements may hereby also be embodied in a porous fashion.

If a mechanical loading of the functional elements in the processing of the insulating profiles or in the product use is foreseeable, then one may provide the functional elements out of stronger/more rigid materials, preferable are materials with an E-modulus of about 2000 MPa or more, particularly preferable are materials with an E-modulus of about 3000 MPa or more.

In alternative insulating profiles in accordance with the invention, the first functional element or functional elements are made on the basis of a metallic material, wherein the metallic material is used in particular in the form of foils or sheets, optionally in combination with functional parts made of plastic.

Further preferable are insulating profiles in accordance with the invention, in which the surface and/or a core of the first functional element or functional elements are entirely or partially metal-coated or metalized or metallically treated. It is thereby possible, e.g., to anchor IR-reflective flags of metal (for example of thin aluminum sheet) on an insulating bar without it adversely affecting the insulation properties of the profile body.

The present invention furthermore relates, as already mentioned at the outset, to a method for producing an insulating profile. According to the method in accordance with the invention, first the profile body or profile bodies are produced as one piece with the rim sections and, separate therefrom, the first functional elements, and in a subsequent step the profile body or profile bodies are materially bonded to the first functional element or functional elements, optionally by means of the rim sections.

The separately produced elements of the insulating profile may be used not only for a specific geometry of an insulating profile. For example, the insulating bar of the insulating profile having a standardized overall height may be combined with different functional elements as required, and thus a wide range of profile geometries may be achieved, without a specific, in particular complex, extrusion tool having to be produced for each individual profile geometry.

Likewise, functional elements may be combined with differently structured insulating bars and thus the single functional element may be used in different insulating bars. This also minimizes tool costs.

Finally, due to the flexibility, achieved in accordance with the invention, in the use of the components, i.e., insulating bar/profile body and functional elements, an economic advantage may additionally be achieved, as the individual component parts or the components may be produced and used in lesser part complexity and in greater quantities.

In the method in accordance with the invention, the material bond of the first functional element or functional elements to the profile body and/or to the rim sections is preferably produced by means of welding, preferably ultrasonic welding, laser welding, infrared welding, heat element welding, or hot gas welding, in particular free of auxiliary material.

Surprisingly, is has turned out that insulating profiles in accordance with the invention can be produced using welding technology, in particular ultrasonic welding, infrared welding, and laser welding, without adversely affecting the mechanical properties of the material used that are relevant for the application. In these methods in accordance with the invention, too, the geometry of the processed components, i.e., in particular the insulating bar and the first functional elements, is preserved with the specified tolerances. This applies especially when using fiber-reinforced polymer materials The welding of two joining partners is effected by means of plasticizing the polymer material in the contact region of the joining partners. Depending on the method, a different amount of plasticized polymer material is hereby produced, or the position and the local extent of the plasticized material will be different. The type and composition of the material, and the amount of energy introduced, the duration (preheating, heating, pressing, holding duration), the pressure or contact pressure applied to the joining partners influences the formation of the weld. Thus, upon ultrasonic welding, for example, a joining partner is preferably provided with an energy director, the latter often being characterized by a tapering, for example a point tapering in the shape of a wedge, which point is then brought into contact with the other joining partner. By introducing energy in the form of ultrasonic oscillations and simultaneously applying a contact pressure, the polymer material of both joining partners is melted, starting from the tapering of the energy director. In particular the tapering of the energy director thereby also melts off and the resulting melt in the joining region gives way to the contact pressure and is driven into free side directions, as the case may be. A plasticized zone hereby forms temporarily in the joining region, which, after the polymer material cools/solidifies, normally no longer allows for a clear association with one of the joining partners.

The input of energy, the quality, and in particular the strength of the welding seam are controllable by appropriately designing the energy directors. It may thus also be controlled whether and how much melt is ejected from the joint zone.

An acumination of the energy director at an angle of 30° to 90° and an available height of the tip of 200 µm to 1.5 mm are preferable. However, truncated or rounded energy directors, or energy directors provided with radii or steps are also possible. The use of such steps make is possible to specify the level of the melt-off in the welding process, because a step then functions as a delimiting stop.

The introduction of the ultrasonic energy may then take place both on the side of the joining partner with an energy director, and also on the opposite side, i.e., through the second joining partner without an energy director. Likewise, an introduction may take place when no energy director is present. The location of the introduction of energy is sensibly selected by a person skilled in the art. Where possible, the introduction of energy should take place in the vicinity of the contact zone of the joining partners and the joint zone. A distance of the sonotrode from the joint zone of about 30 mm or less is preferable, a distance of about 10 mm or less is particularly preferable. Likewise, it is preferably ensured that, where possible, no hollow chambers or constructively interposed cavities are present in a direct line between the sonotrode at the place of the introduction of energy and the joint zone. The introduction of the ultrasonic energy into solid materials and/or the conduction of the ultrasonic energy in rectilinear direction through the first joining partner to the joint zone is further preferable. One deviates from a rectilinear direction of introduction and transmission in particular if introduced via a geometrically branched structure, for example a hollow chamber profile.

In a first embodiment, the introduction of energy preferably takes place by way of a static sonotrode which, for example, is configured in the form of a skid or a roller, the joining partner or joining partners is/are then typically guided past the sonotrode in permanent contact with the same. In this variant, the welding is then carried out on a continuously moved insulating profile.

In a further embodiment, a production cycle with a traveling sonotrode is also conceivable, the latter first traveling in contact with the joining partner/joining partners in the conveying direction, then traveling back into a starting position without contact to the joining partners, in order to then begin the cycle again. In this variant, too, the welding is carried out on a continuously moved insulating profile.

Furthermore, an embodiment variant is conceivable in which the sonotrode(s) perform only a stroke movement while the joining partners are advanced in steps in the conveying direction. In this variant, the welding is then carried out on an unmoved, stationary insulating profile.

In these variants, the contact pressure and/or the ultrasonic energy input may be kept constant or be varied over time. The contact pressure may preferably also be selected to increase and decrease in cycle with the welding cycle.

The contact pressure acts from the sonotrode via the joining partners to an opposing stop or an anvil. Said anvil may likewise be constructed in the form of rollers, contact skids, or the like.

The infrared welding already mentioned is also a suitable method for welding polymer materials in the production of the insulating profiles in accordance with the invention. A heating, softening, superficial melting, or complete melting of the polymer material(s) is hereby achieved by means of heat radiation (infrared radiation, IR), preferably with radiation portions in the short-wave or medium-wave IR-wavelength range of 0.78 µm to 1.4 µm and 1.4 µm to about 4 µm, respectively.

The infrared radiation may hereby be introduced over an area or focused, for example only in the region of the joint zone of one or both joining partners. Suitable infrared radiators are commercially available and may be adapted both to diverse geometric contours and to diverse fields of application in process engineering.

In a preferred embodiment, one aligns one or a plurality of IR-radiation sources in parallel to the longitudinal direction of the joining partner or joining partners. As a result, in a continuous in-line process, for example, precisely the potential joint zones may be exactly irradiated to a few mm, while the joining partners are conveyed on in the production process. The infrared welding method for plastic profiles is also able to be implemented as a discontinuous process.

By adapting diverse parameters like, for example, radiator power, wavelength, distance of the radiator from the irradiated surface, or dwell time of the joining partners in the irradiated region (depending, among other things, on the length of the IR-radiator in the conveying direction, conveying speed of the joining partner, optionally the holding time under the radiator) the desired welding conditions like, for example, the extent of plasticizing (surface temperature of the irradiated joining partner, temperature of the melt, surface and depth extent of the melt) may be adjusted in a targeted manner. These welding conditions are material-specific. Preferably both joining partners are superficially melted at the surface. The joining partners may thereby be free of auxiliary material, though it is also possible to apply an auxiliary material on one or both joining partners or to supply an auxiliary material.

After the irradiation has taken place and good welding conditions are present, the joining partners are then quickly (for example within five seconds, preferably within one second) brought into the desired relative position. The radiation source is typically removed for this purpose or the joining partners are conveyed out of the region of the radiation source(s). The joining partners are then brought into contact and pressed against each other while one or both joining partners still has or have a plasticized joint zone.

The positioning of the two joining partners can be effected by geometrical delimitations, e.g., guidance and stop elements in the form of rollers, rails, conveyor belts or matrices.

The compression process can be divided into a pressing and a holding process, wherein in each case a static or variable pressing force ($F_A$) and holding force ($F_H$), respectively is exerted. A control of the compression process may thereby take place in a force-controlled manner (a force F is specified as a target, the path or the compression depth automatically follows therefrom) or in a path-controlled manner (a path or a compression depth is specified, the system applies the necessary force).

The necessary acting times of the forces $F_A$ and $F_H$ are dependent on the diverse general conditions (material selection, geometries, welding temperatures, manner of the introduction of force, etc.). It is important here, however, that the force $F_H$ acts long enough to avoid a releasing of the joint connection. $F_H$ is typically let to act until the plasticized regions of the joint zone have solidified again, in particular $F_H$ is let to act until the temperature of the joint zone has fallen below the solidification temperature or below the crystallization temperature or below the glass transition temperature.

The forces may be introduced to the joining partners, e.g., via rollers, rolls, stamps, skids, caterpillar bands, etc.

A person skilled in the art will sensibly and quickly determine the joining parameters, in particular the pressing and holding forces as well as the respective durations for the particular application.

As an alternative to the connection variants stated above, in accordance with the invention, the material bond of the first functional element or functional elements to the profile body and/or the rim sections is produced by means of adhesion, preferably by means of solvent adhesion, or using melt adhesives, solvent-based adhesives, contact adhesives, or hardening single-component (1K) or two-component (2K) adhesive systems For many polymers there are suitable solvents, thus polymer materials derived from said polymers may be adhesively bonded to a sufficient extent. The polymer material is hereby superficially dissolved, for example by locally applying solvent to the joining partners. When one then brings said joining partners firmly together, a fixed connection thus forms after removal/decomposition/neutralization of the solvent (heating, venting or the like) by the polymer chains entangling between the joining partners as a result of diffusion processes. Likewise, a polymer dissolved in solvent may be introduced between the joining partners. The dissolved polymer may be identical to, similar to, or different from the polymer material of the joining partners. The dissolved polymer is preferably a solvent adhesive.

Known systems which are suitable to be adhesively bonded with the aid of solvents are, among other things, aromatic solvents, for example toluene or xylene or halogenated solvents, for example chloroform or dichloroethylene, for the polymers polyphenylene ether, or organic solvents, for example aromatic solvents like toluene, xylene, halogenated solvents like methylene chloride, chloroform or polar solvents, for example butylacetate, methylethyl ketone for polystyrene (all tacticities) or for ABS materials (acrylonitrile butadiene styrene), the solvents cyclohexanone or tetrahydrofuran for the polymer polyvinyl chloride, diverse organic or inorganic acids, for example formic acid or phosphoric acid, and organic, preferably aromatic solvents, for example resorcinol for polyamides.

According to the method in accordance with the invention, the material bond between the first functional element or functional elements and the profile body and/or rim section may take place continuously, in sections, or at points along the longitudinal direction of the insulating profile.

In accordance with the invention, the insulating bar, in particular the profile body thereof, in the manufacture thereof or in a subsequent step, may first be provided with one or a plurality of assembly elements to which the first functional element or functional elements are connected.

The method in accordance with the invention allows for a multiplicity of variations, such that the further functional elements are able to be materially bonded not only to the profile body or the rim sections, but also to the first functional element or functional elements. In particular, an insulating profile in accordance with the invention may also be composed of two or more insulating bars, and the respective insulating bar may comprise two or more profile bodies.

According to a further variant of the method in accordance with the invention, the profile body with the rim sections and/or the functional elements may be provided as endless material and after producing the material bond of the same, the insulating profile is cut to a specified length by a cutting, punching, or milling process.

The endless material or the endless materials is/are hereby preferably provided on rolls, spools, or reels.

Alternatively, in the method in accordance with the invention, the profile body with the rim sections and/or the functional elements may be provided as bar-type goods prior to effecting the material bond.

BRIEF DESCRIPTION OF THE SEVERAL VIEWS OF THE DRAWINGS

These and further advantages of the invention will be explained in more detail in the following with the aid of the drawings. In the drawings:

FIGS. 4A to 4G and 5A to 5C show various exemplary variants of the production of insulating profiles in accordance with the invention;

FIGS. 6-1A, 6-1B, 6-1C, 6-2A, 6-2B, 6-2C, and 6-3 show further variants of insulating profiles in accordance with the invention, which are produced by means of ultrasonic welding, as well as a schematic representation for this method;

FIG. 7 shows a variant of the first embodiment of the insulating profiles in accordance with the invention in comparison with further embodiments of insulating profiles in accordance with the invention;

FIGS. 9A to 9D show further embodiments of the insulating profiles in accordance with the invention and the production thereof;

FIGS. 10A to 10F and 11 show further embodiments of the insulating profiles in accordance with the invention;

FIG. 12 shows a further embodiment of the insulating profiles in accordance with the invention;

FIGS. 13 and 14 show further embodiments of the insulating profiles in accordance with the invention and the production thereof;

FIGS. 16 and 17 show two further embodiments of an insulating profile in accordance with the invention and the production thereof;

FIGS. 18A to 18D show four variants of transition regions and joint zones, respectively, of conventional insulating profiles in accordance with the invention;

FIG. 19 shows further embodiments of a joint zone of an insulating profile in accordance with the invention;

FIGS. 21A to 21D show a schematic depiction of a method for infrared welding in the production of an insulating profile in accordance with the invention;

FIGS. 23A to 23C show embodiments of an insulating profile in accordance with the invention with the function of a facade spacer in a plurality of variations;

FIGS. 24A and 24B show further embodiments of an insulating profile in accordance with the invention with the function of a facade spacer in a plurality of variations; and FIGS. 25A to 25D show further embodiments of the insulating profile in accordance with the invention with the function of a facade spacer in a plurality of variations.

DETAILED DESCRIPTION OF THE INVENTION

Figure 1A:
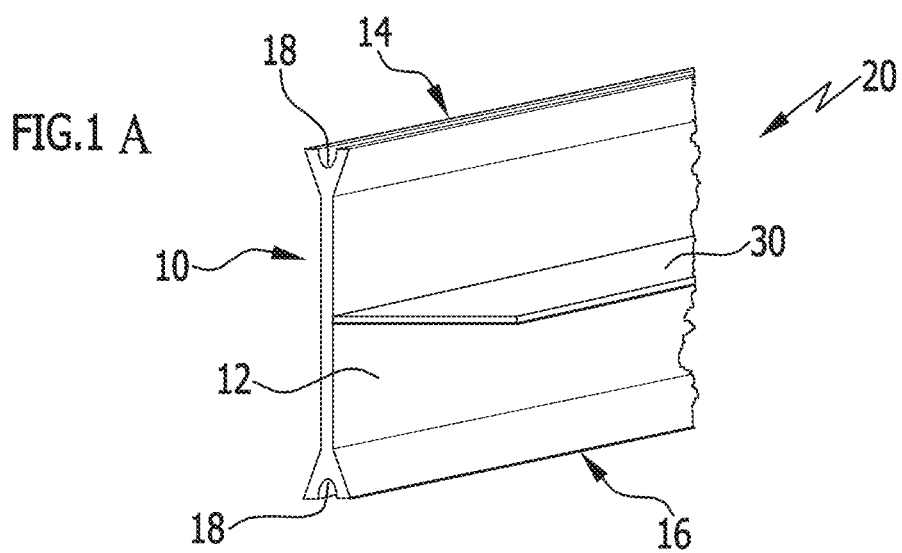
FIGS. 1A to 1C show three variants of a first embodiment of the insulating profiles in accordance with the invention.
Figure 1B:
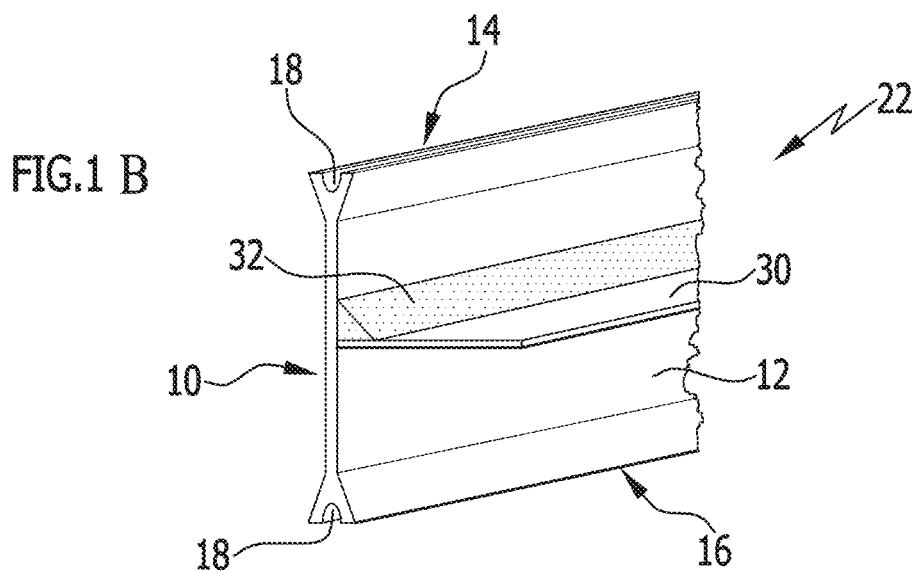
Figure 1C:
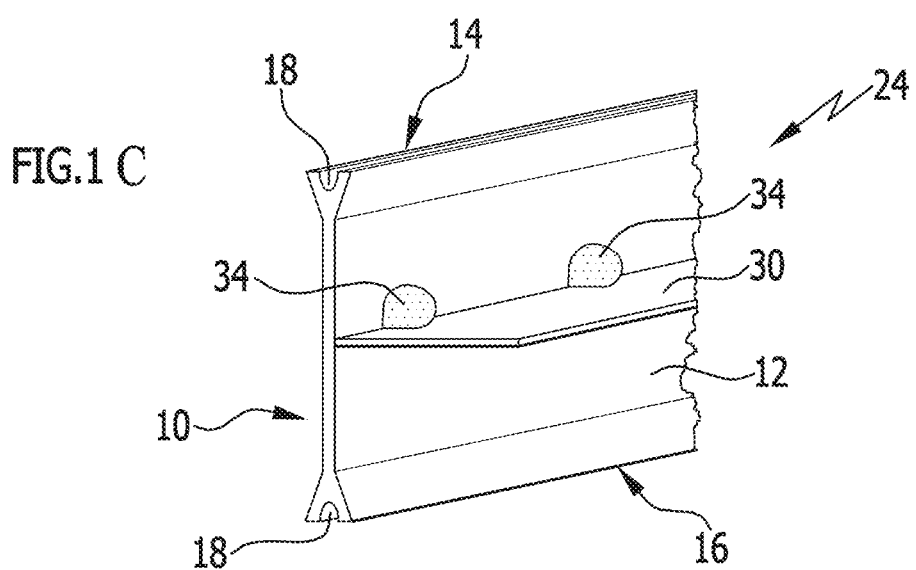

FIGS. 1A to 1C show a first embodiment of the insulating profiles in accordance with the invention in different variants, which each are based on an insulating bar 10 with a planar profile body 12. Adjoining the profile body 12 are rim sections 14, 16 which are configured as roll-in heads. The rim sections 14, 16 also extend in the longitudinal direction of the insulating profile in accordance with the invention and are formed on the outer rims of the profile body 12 at a distance transverse to the longitudinal direction. The production of such insulating bars 10 from a polymer material with a high degree of accuracy of the cross-sectional geometry and high linearity in one extruding step is economically possible without a great deal of expenditure. The extruding tools required for the process are of little complexity and are also available relatively economically.

When processing the insulating profile in accordance with the invention in the form of metal-plastic composite profiles, the rim sections 14, 16 designed as roll-in heads can be pushed into corresponding grooves of the metal profiles and be connected thereto in shear resistant manner if necessary in the course of a so-called roll-in step.

Moreover, the rim sections 14, 16 may, as shown in FIGS. 1A to 1C, have a groove 18 into which a so-called fusible wire (not shown) may be placed. The fusible wire is preferably held in the groove 18 in a form- and/or force-fitting manner. After producing the roll-in connection, the fusible wire may be activated by heating, for example in the powder coating baking process, for further securing the shear-resistant connection of the insulating profile to the metal profile.

Shown in FIGS. 1A, 1B, and 1C are three variants of insulating profiles 20, 22, and 24, respectively, in accordance with the invention, in the case of each of which a first strip-shaped functional element 30 is connected to the planar profile body 12 of the insulating bar 10, substantially in the middle in relation to the transverse direction thereof.

The first functional element 30 of the insulating profiles 20, 22, 24 is produced separately and is subsequently connected to the insulating bar 10 and the profile body 12 thereof, respectively. Economical manufacturing methods for manufacturing the first functional element 30 are also at the disposal of the person skilled in the art, for example the extrusion process in the event that the first functional element is made from a polymer material. Likewise, the functional element may come from a large-area web material (for example blown film, calendared plate or foil), which is then appropriately cut to size, punched and or reshaped.

The connection of the first functional element 30 to the respective profile body 12 may take place in different ways, and for this FIGS. 1A, 1B, and 1C schematically show three different examples.

According to FIG. 1A, the functional element 30 is connected to the insulating bar 10 substantially continuously by way of a connection limited to the edge of the functional element 30, for example a welding seam, for forming the insulating profile 20, wherein this may optionally take place without the addition of auxiliary materials when the compatibility of the polymer materials of which the insulating bar and the first functional element are formed is sufficient.

In FIG. 1B, the connection of the insulating bar 10 and the first functional element 30 for producing the insulating profile 22 takes place by means of an auxiliary material that is applied as a continuous strand 32.

Furthermore, the connection between the insulating bar 10 and the first functional element 30 may be produced by means of auxiliary material 34 applied at predetermined, in particular regular distances (at points or in sections).

The connecting technology in accordance with FIGS. 1A and specifically 1B and 1C may also be used if the materials of the insulating bar and the first functional element are not compatible with each other, and in particular even if not a polymer material, but rather, e.g., a metallic material, for example in the form of a metal foil or a metal sheet, is used for the production of the first functional element.

The connection between the insulating bar 10 and the first functional element 30 often only has to be stable enough for the insulating profile 20, 22 and 24, respectively, to be reliably ensured during transportation and processing actions up to a metal-plastic composite profile, since, in the assembled state, the first functional element 30 shown in FIGS. 1A to 1C often does not have to accommodate any forces and, for example, serves merely to suppress convection currents in the interior of a metal-plastic composite profile.

Figure 2:
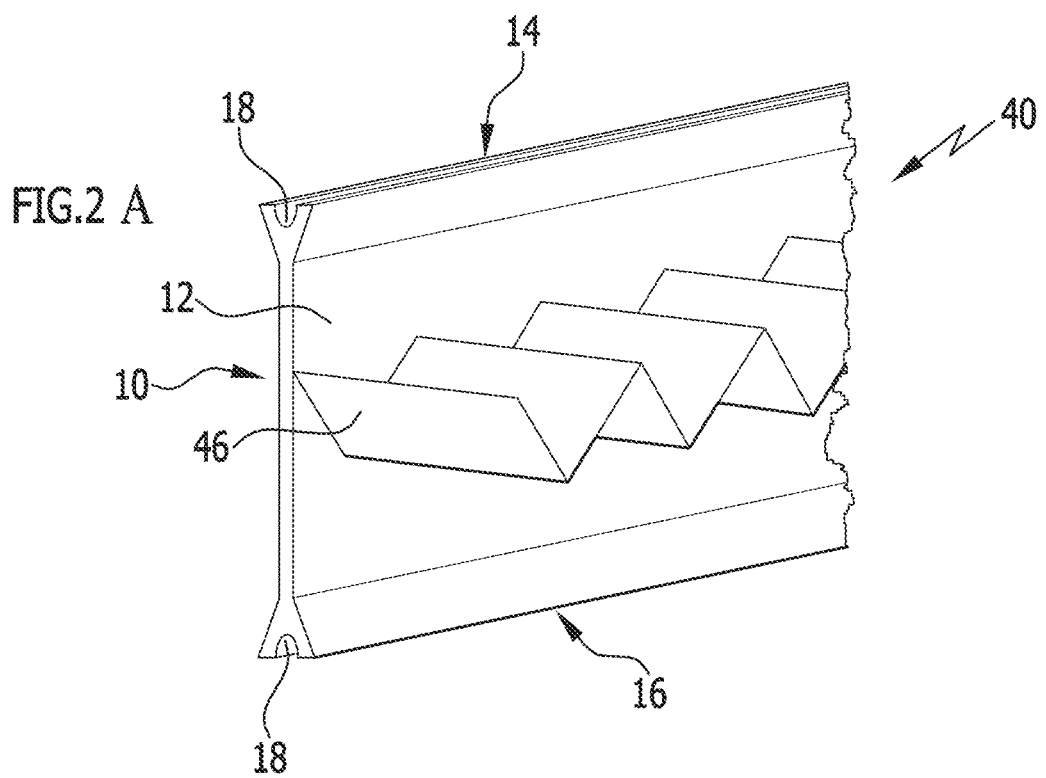
FIGS. 2A to 2C show three further variants of the first embodiment of the insulating profiles in accordance with the invention.
Figure 2:
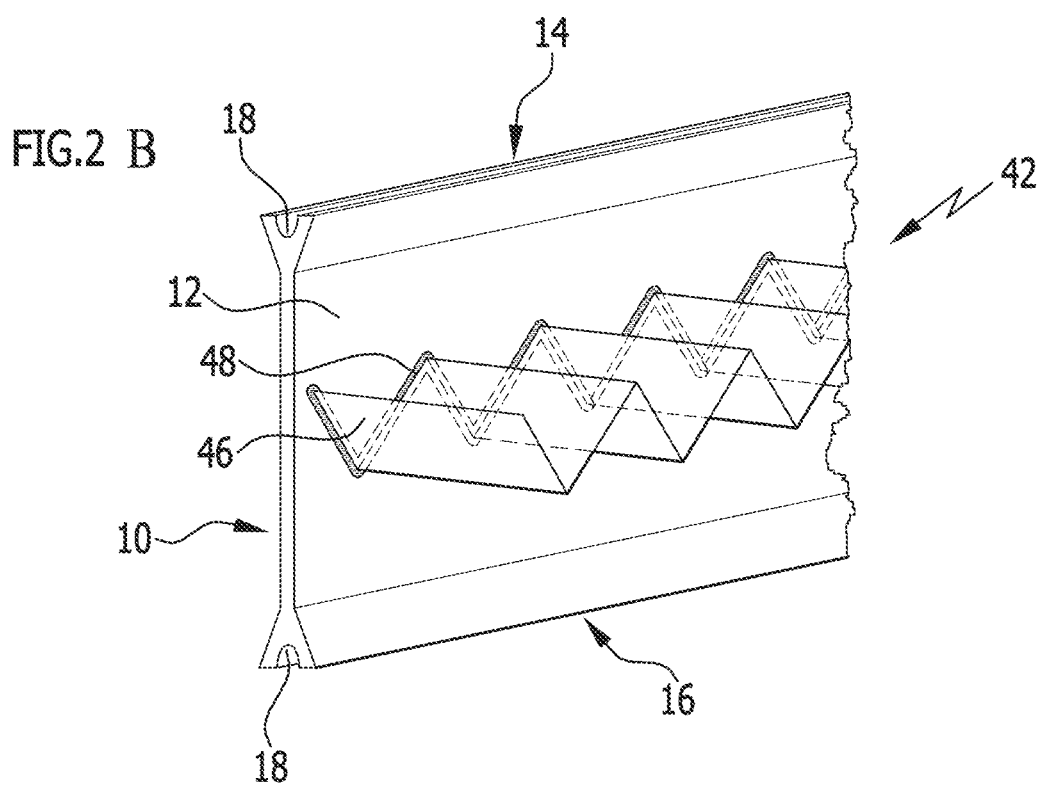
Figure 2C:
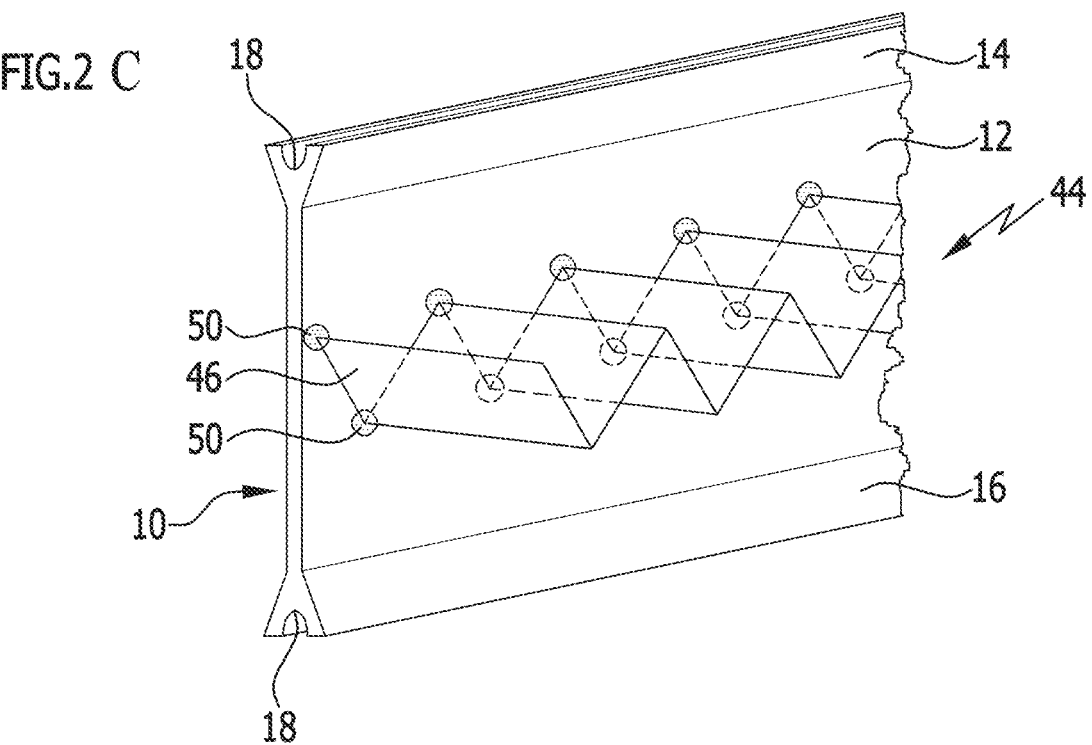

FIGS. 2A to 2C show three further variants of the first embodiment of the insulating profiles in accordance with the invention, each based on an insulating bar 10 with a profile body 12, and rim sections 14, 16 formed thereon, as was already described in the context of FIGS. 1A to 1C.

In the variant according to FIG. 2A, serving as a first functional element 46 is a flat material which in plan view is folded to a zig-zag line and which, as described in conjunction with FIG. 1A, may be connected to the insulating bar 10 without the use of an auxiliary material to form an insulating profile 40 if the first functional element 46 is produced of a material that is compatible with the polymer material of the insulating bar 10.

FIG. 2B shows a further variant of an insulating profile 42 in accordance with the invention in which the first functional element 46 is applied to the insulating bar 10 by means of an auxiliary material 48 in the form of a strand which extends along the entire contour of the first functional element 46 that abuts the insulating bar 10. Alternatively, the auxiliary material 48 of the strand may also be applied only in sections at predetermined distances (not shown) or, as shown in FIG. 2C, the first functional element 46 may be connected to the insulating bar 10 with an application 50 of an auxiliary material only at points.

The application of the auxiliary material at points in FIG. 2C positively influences, in comparison to FIG. 2B, the insulating effect of the insulating profile, especially when a hairline gap is formed between the functional element and profile body and a connection is effected exclusively by way of the auxiliary material. As a result of these measures, it is avoided that, in addition to the heat flow in the base profile, a significant portion of the heat flow also flows via the functional element. At the same time however, less strength is achieved in the connecting zone as a result of the reduced joint area.

As mentioned in the context of the description of FIGS. 1B and 1C, in the case of the variants of FIGS. 2B and 2C, a broader range of materials may be used for the production of the first functional element 46, because a sufficient connection between the first functional element 46 and the insulating bar 10 may be produced by means of the auxiliary material that is in the form of a strand 48 or in the form of an application 50 at points.

Figure 3:
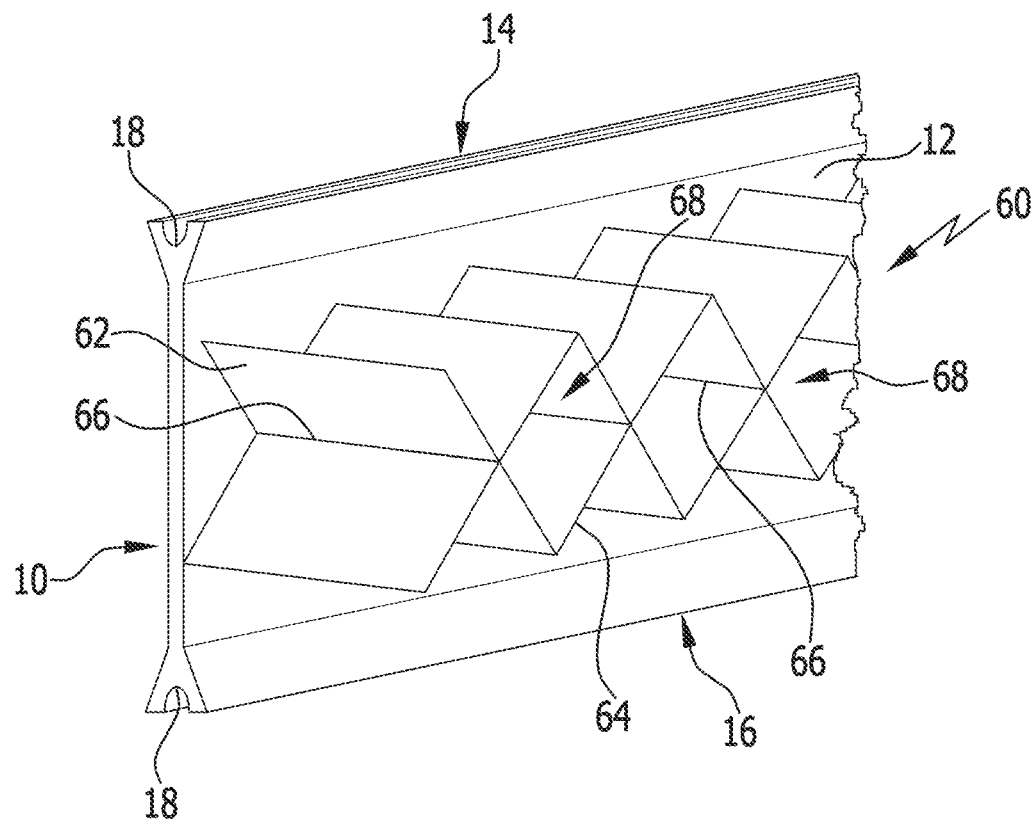
FIG. 3 shows a further variant of the first embodiment of the insulating profiles in accordance with the invention.

FIG. 3 shows a further variant of the first embodiment in the form of an insulating profile 60 in accordance with the invention in which two first functional elements 62, 64 which both, similarly to the first functional elements 46 of the variants of FIGS. 2A to 2C, are of zig-zag configuration.

The two first functional elements 62, 64 meet with their lower and upper edges, respectively, at regular distances on connecting lines 66 and may, as required, be materially bonded to each other in order to increase the mechanical stability at or, as the case may be, along these contact areas 66.

The use of two first functional elements 62, 64, as shown in FIG. 3, is advantageous in particular when the overall height, i.e., the spacing of the rim sections 14, 16, of the insulating bar 10 is relatively high, such that a cavity bounded by a metal-plastic composite profile is subdivided into many individual segments by the chambers 68 forming between the first functional elements 62 and 64, in which segments a convection is effectively suppressed.

FIGS. 4A to 4G show in different exemplary variants production possibilities for the insulating profiles in accordance with the invention.

In accordance with FIG. 4A, an insulating bar 70 is connected to a first functional element 72 for producing an insulating profile 78 in accordance with the invention, without the use of an auxiliary material. The first functional element 72 is thereby provided with a perpendicularly protruding projection 74 on the rim that is to be connected to the insulating bar 70, such that the contact or joint surface, via which the connection between the insulating bar 70 and the first functional element 72 may be effected, is enlarged and thus results in a better mechanical strength of the connection. The projection may be designed specifically for the application, in particular it may be enlarged, made smaller, or be completely removed, as is also shown schematically in FIG. 6-1 C.

Optionally, the functional element 72 may be embodied in two layers in the region of the projection 74 or as a whole, wherein the surface coming into contact with the insulating bar 70 then comprises a material with which a connection to the insulating bar may be produced free of auxiliary material. This enables an even greater possibility of variation with respect to the material of which the functional element 72 is to be primarily produced.

According to FIG. 4B, the insulating bar 80 is provided with a first functional element 82 and then forms the insulating profile 88.

The first functional element 82 has, in turn, on its rim that is to be connected to the insulating bar 80 a perpendicularly protruding projection 84 which is materially bonded by means of an auxiliary material 86 applied on the insulating bar 80. The projection here may of course be adapted specifically to the applications, as was already described for FIG. 4 A.

The auxiliary material 86 may again be applied as a continuous strand along the length of the insulating bar 80, in certain sections and at predetermined distances, or at points, depending on what strength the respective application purpose requires for the connection between the insulating bar 80 and the functional element 82.

According to FIG. 4C, an insulating bar 90, in turn, is connected to a first functional element 92, wherein the rim of the first functional element 92 that is to be connected to the insulating bar 90 has a perpendicularly protruding projection 94 which is provided with a layer of an auxiliary material 96. By joining the insulating bar 90 and the first functional element 92, the insulating profile 98 is then formed with the aid of the auxiliary material 96.

FIG. 4D uses an insulating bar 100 and a first functional element 102 which is provided with an L-shaped connecting element 104 on an edge to be connected to the insulating bar 100.

The L-shaped connecting element 104 is connected with the longer leg to the first functional element 102, while the shorter leg protruding perpendicularly thereto serves to connect the first functional element 102 to the insulating bar 100. The insulating profile 108 in accordance with the invention may thus optionally likewise be formed free of auxiliary material, from the insulating bar 100 and the first functional element 102.

In accordance with FIG. 4E, an insulating bar 110 is used which is provided with an assembly projection 114 approximately in the center for connecting to a first functional element 112.

The assembly projection 114 may be formed as one piece with the insulating bar 110 or subsequently be formed onto or connected to the insulating bar 110. The connection between the assembly projection 114 and the first functional element 112 may, in turn, occur free of auxiliary material if the materials of the projection 114 and the first functional element 112 are sufficiently compatible with each other, thus forming the insulating profile 118.

Figure 4:
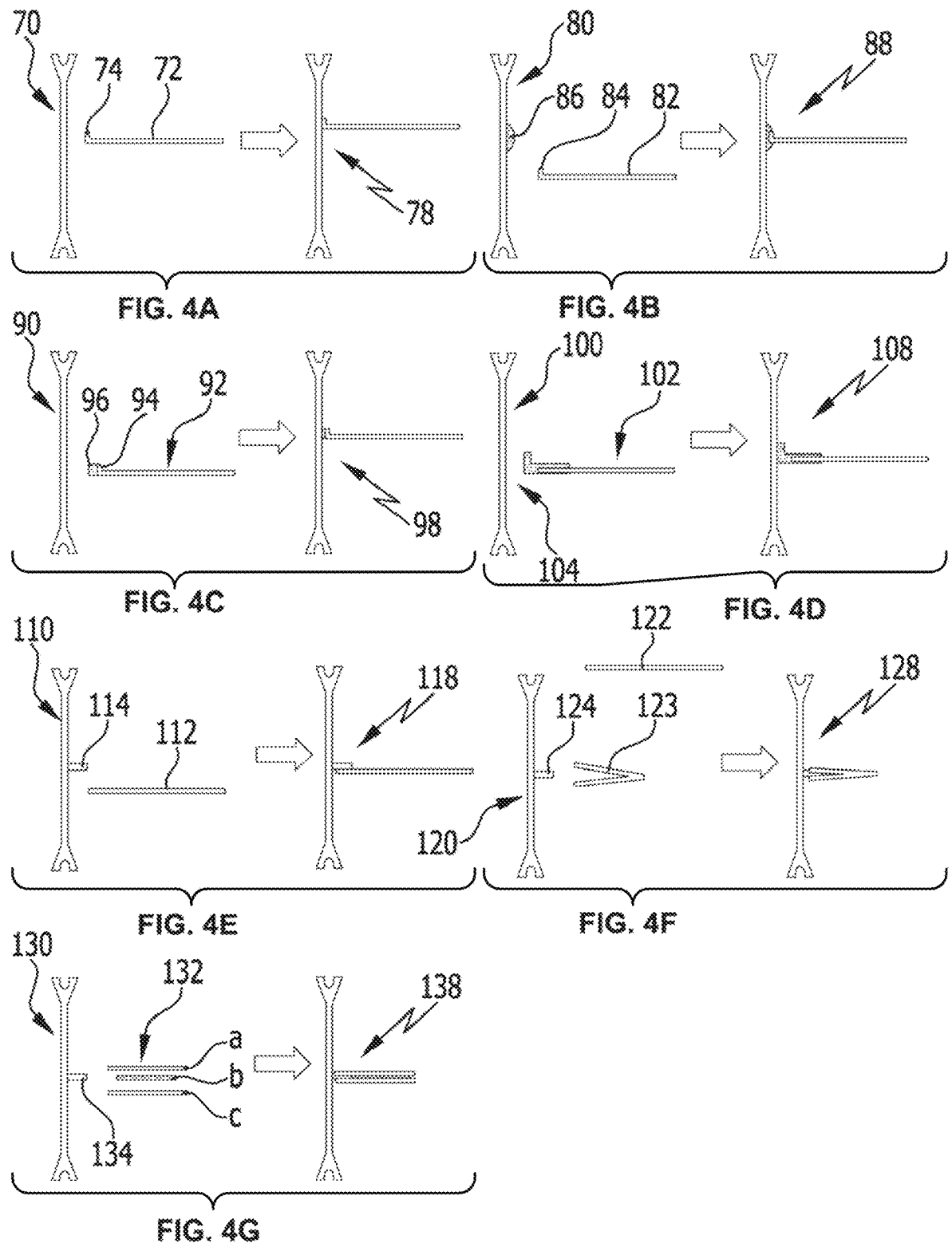

If a greater variability is required in the selection of the respective materials for the production of the insulating bar 110 on the one hand and the first functional element 112 on the other hand, the connection between the insulating bar 110 and the first functional element 112 may also be effected by means of an auxiliary material, as was described for example for Variants B and C of FIG. 4. Likewise, it is conceivable for the first functional element 112 to be of two-layer configuration, wherein the layer which comes into connection with the assembly projection 114 then must be sufficiently compatible to otherwise enable a connection free of auxiliary material.

In FIG. 4F, an insulating bar 120 is used which is connected to a first functional element 123 for forming the insulating profile 128.

For fastening the first functional element 123 to the insulating profile 120, the insulating profile 120 is provided with an assembly projection 124, similarly to how it was described in the context of FIG. 4E. The first functional element 123 is hereby formed of a strip-shaped sheet material 122 which is folded back on itself in the longitudinal direction and thus leads to the free ends abutting on both sides against the assembly projection 124.

In a further variation, in accordance with FIG. 4G, an insulating bar 130 may be connected to a first functional element 132 to form an insulating profile 138, wherein the insulating bar 130, in turn, has an assembly projection 134 substantially in the middle.

The first functional element 132 is structured in three layers, wherein the layers a, b, c may be used separately or prefabricated as a three-layer unit. The first functional element 132 is preferably designed such that the middle layer b is set back at the rim facing the insulating bar 130, and thus the assembly projection 134 upon assembly is able to engage between the layers a and c.

Different preferred methods for producing the insulating profiles in accordance with the invention are to be laid out on the basis of FIGS. 5A to 5C.

FIG. 5A shows a method in which an insulating profile 150 is produced of an insulating bar 152 and a first planar functional element 154, wherein the first functional element 154 has at its rim 156 to be connected to the insulating bar 152 a perpendicularly protruding projection 158. In this embodiment, the projection 158 is formed as one piece with the first functional element 154 and on a face 160 remote from the first functional element 154, said projection 158 is provided with an auxiliary material 162, which is selected such that it is able to enter into a material bond both with the material of the functional element 154 and with the material from which the insulating bar 152 is made. The auxiliary material 162 may thereby be applied continuously along the longitudinal direction of the projection 158, for example in the form of a so-called bead, or be applied in bead sections applied at predetermined distances, or at points in the form of drops on the face 160, and materially adhere there.

When connecting the insulating bar 152 to the first functional element 154, the auxiliary material 162 is made to soften or melt by means of the input of energy, such that when pressing the first functional element 154 with a specified force K against a surface of the insulating bar 152, a material bond of the auxiliary material 162 with the material of the insulating bar 152 forms.

A variant of this is shown in FIG. 5B, in which an insulating profile 180 in accordance with the invention is formed of an insulating bar 182 and a first functional element 184. In this variant, the insulating bar 182 has a projection 186 which protrudes perpendicularly from one of its surfaces and to which the first functional element 184 is connectible.

In this variant, the first functional element 184 may have a completely planar geometry. The connection, in turn, between the functional element 184 and the insulating bar 182 is produced by means of an auxiliary material 188 which, similarly to how it is described in the context of FIG. 5A, may be applied continuously, in sections, or at points on a surface of the first functional element 184. In a further alternative, the auxiliary material 186 may also be applied on a surface of the projection 184 (not shown).

When connecting the insulating bar 182 to the first functional element 154, the auxiliary material 188, in turn, is made to soften or melt by means of the input of energy, such that when pressing the first functional element 154 with a specified force K against a surface of the insulating bar 182, a material bond of the auxiliary material 188 with the material of the insulating bar 182 forms.

As a result of the variation of the force K, in the examples of FIGS. 5A and 5B, the contact area produced between the auxiliary material 162 and 188, respectively, and the surfaces of the respective insulating bars 152, 182 and the surfaces of the first functional elements 154, 184 (and the projections on the functional element side of the insulating bar side, respectively) and thus between the two components may be dimensioned such that it results in a sufficient predetermined holding force.

FIG. 5C shows in a variation of the example of FIG. 5B an insulating profile 200 in accordance with the invention, which is produced of an insulating bar 202 and a first functional element 204. Analogously to the insulating profile 180 of FIG. 5B, in the case of the insulating profile 200, the insulating bar 202 has a projection 206 protruding perpendicularly from a surface, by way of which projection 206 the insulating bar 202 is connectable to the first functional element 204. The projection 206 may be produced as one piece with the insulating bar 202.

In this example, however, the material bond between the insulating bar 202 and the projection thereof 206, respectively, and the first functional element 204 is produced free of auxiliary material. For this purpose, the materials of which the insulating bar 202 and the first functional element 204 are produced must be compatible with each other, such that the material selection is limited here in comparison to the embodiments of FIGS. 5A and 5B.

One of the preferred methods for producing the insulating profiles in accordance with the invention is to be described in detail on the basis of FIGS. 6-1A, 6-1B, 6-1C, 6-2A, 6-2B, 6-2C and 6-3.

Figures 2, 6:
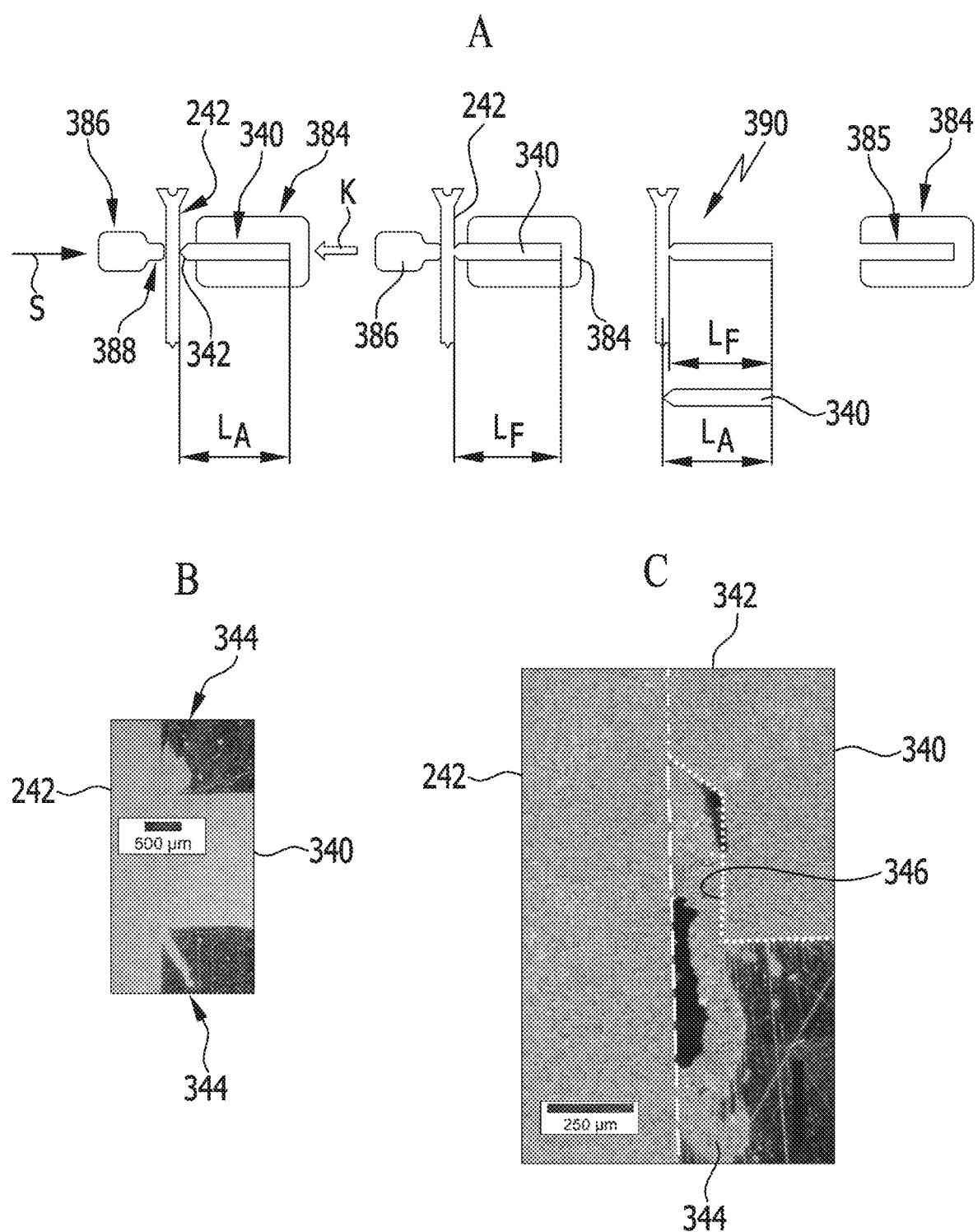
Figures 3, 6:
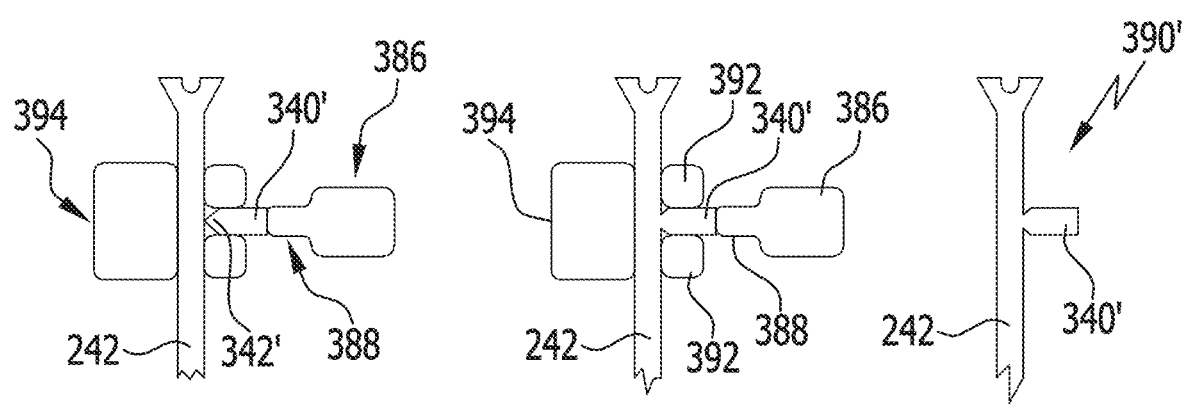

FIG. 6-1A shows an insulating profile 220 in accordance with the invention, which is produced free of auxiliary material from an insulating bar 222 and a first functional element 224 in an ultrasonic welding process. Analogously to the insulating profiles 180 and 200 of FIGS. 5B and 5C, the insulating bar 222 of the insulating profile 220 has a projection 226 protruding perpendicularly from a surface, by way of which projection 226 the insulating bar 222 is connectable to the first functional element 224. The projection 226, in turn, may be produced as one piece with the insulating bar 222.

For materially bonding the first functional element 224 to the projection 226 of the insulating bar 222, the functional element has a thicker section 228 which is triangular in cross section and which, upon materially bonding the insulating bar 222 and functional element 224, may be deformed under the effect of the force K to a sufficiently large-area contact zone 230. The input of energy is effected by means of a so-called sonotrode, which is placed against the insulating bar opposite to the first functional element (see arrow S).

In addition to the force K, the mechanical strength of the connection of the insulating bar 222 and functional element 224 is controllable by way of the input of energy, wherein both the intensity of the energy irradiation and also the time may hereby be varied.

The same principle is applied in the variant of the example of FIG. 6-1 B, in which an insulating profile 240 in accordance with the invention is produced free of auxiliary material, from an insulating bar 242 and a first functional element 244. The first functional element 244 is equipped with a perpendicularly protruding projection 248 on its rim 246 to be connected to the insulating bar 242. In this embodiment, the projection 248 is formed as one piece with the first functional element 244 and has on a face 250 remote from the first functional element 244 a thicker section 252 which is triangular in cross section.

When materially bonding the insulating bar 242 and functional element 244 by means of ultrasonic welding, the thicker section 252 is deformed under the effect of the force K to a sufficiently large-area contact zone 254.

A multiplicity of differently configured first functional elements, which are depicted for example in FIG. 6-1 C in addition to the first functional element 244, are suitable for this method.

A further variant of a first functional element is depicted in FIG. 6-1 C in the form of the first functional element 260, wherein the first functional element 260 is formed of a substantially planar, strip-shaped body, on the one rim of which that is to be connected to an insulating bar an upwardly protruding, wedge-shaped protrusion 262 is formed, which, in a comparable way to the thicker section 228 of the first functional element 224, which is triangular in cross section, contains a sufficient, deformable mass to, in the course of an ultrasonic welding step, produce an optionally large-area contact zone to the insulating bar to be connected.

Another variant is depicted in FIG. 6-1 C in the form of a first functional element 280, in which a transverse web 282 is formed on the substantially planar, strip-shaped body of the functional element 280 on the rim thereof that is to be connected to an insulating bar, such that cross sectional profile is formed that is T-shaped as a whole.

Formed on the surface of the transverse web 282 that is remote from the first functional element 280 are two thicker sections 284 and 286 which are triangular in cross section and which, in the course of a step for connecting the first functional element 280 to an insulating bar, provide the mass that is deformed to form a contact zone. Two joining regions result according to this variant, thus it is obvious that the joint zone can now be more heavily mechanically loaded.

In a further variant of a first functional element 300, formed on the rim of the first functional element 300 that is facing the insulating bar in the assembled state is a perpendicularly protruding projection 302, the mass of which in turn is available for the production of a contact zone between the first functional element 300 and the insulating bar to be connected thereto.

In the variant that is depicted in FIG. 6-1 C as first functional element 320, a projection 322 protruding at an angle of about 60 to 70° is provided, which likewise contains sufficient mass to, under deformation, produce a contact zone between the first functional element 320 and an insulating bar to be connected thereto.

A further, very simple variant is show in FIG. 6-1 C as the first functional element 340, wherein a thicker section 342 which is triangular in cross section is formed directly on the rim of the first functional element 340. The mass made available here to a somewhat lesser degree for forming a contact zone may be sufficient in many cases and optionally a portion of the material that is provided by the strip-shaped first functional element 340 may additionally be used for forming a contact zone.

In the context of the variants of the first functional elements 360 and 380, it is only to be shown for example that even significantly more complex forms of the first functional elements are possible.

The first functional element 360 of FIG. 6-1 C has a substantially U-shaped profile with two parallel wall sections 362, 364 and a transverse wall element 366 connecting said two wall sections 362, 364.

The transverse wall element 366 has on its surface remote from the two wall elements 362, 364 a thicker section 368 which is substantially triangular in cross section and which substantially provides the material that is deformed to the contact zone or joint zone when connecting the first functional element 360 to an insulating bar.

A further variant is shown in FIG. 6-1 C as a first functional element 380 which in cross section has a contour that is approximately part-circle shaped, which contour has on an outer surface a thicker section 382 that is triangular in cross section, which thicker section 382 is deformable to a contact zone upon materially bonding the first functional element 380 to an insulating bar. In FIGS. 6-1A to 6-1C only triangular thicker sections are shown, which function as energy directors for the welding process, though it is also possible to use other geometries for this purpose. In addition to flattened geometries, these are in particular also tapering structures, for example round or round-ish or stepped cross sections.

Additionally, the method sequence for materially bonding the insulating bar 242 and the first functional element 340 is depicted in FIG. 6-2 A. The functional element 384 is placed in a guide gap 385 of a mount 384, also called anvil, wherein the, in the illustration, left rim of the first functional element 340 has the triangular thicker section 342 and protrudes out of the mount 384.

The first functional element 340 is pressed with the thicker section 342 against a surface of the insulating bar 242 with a predetermined force K by means of the mount 384, while on the opposite surface of the insulating bar 242 an ultrasonic generator 386 is brought with a so-called sonotrode 388 in the direction of the arrow S into contact with the insulating bar 242. The effect of the ultrasound leads to a melting/softening of the polymer materials of the insulating bar 242 and of the first functional element 340 in the region of the thicker section 342. The original width $L_A$ of the first functional element 340 hereby reduces to the width $L_F$, wherein the difference of $L_A$ and $L_F$ corresponds about to the height of the thicker section 342. The difference may be, e.g., about 50 μm to about 5.0 mm, the difference is preferably about 200 μm to about 1.5 mm.

The ultrasound generator 386 and the mount 384 may then be removed. The joining partners are preferably fixed until the melt has solidified and no undesired deformation or displacement of the joining partners occurs. The required holding time may thereby last, depending on the combination of materials, process parameters, and geometry of the joint location, from a few ms to multiple s. This process is preferably implemented in-line, the profile thereby being conveyed through process equipment that implements the joining method.

FIG. 6-2 B shows the micrograph of a cross section of the connection of the insulating bar 242 to the first functional element 340, wherein on both sides of the junction of the first functional element 340 with the insulating bar 242 a so-called melt ejection 344 can be observed. The melt ejection 344 may be easily removed by means of mechanical processing, should this desired from the standpoint of appearance.

FIG. 6-2 C shows the same situation as FIG. 6-2 B in greater resolution on a sample in which the contact pressure is set to less when materially bonding by means of ultrasounds than in the manufacture of the sample that is shown in FIG. 6-2 B. Therefore a certain gap, which is able to accommodate a portion of the melt ejection, remains between the rim 346 of the first functional element 340 and the surface of the insulating bar 242. The contact zone between the first functional element 340 and the insulating bar 242 is thereby of smaller-area configuration. In a range of applications, this may be accepted.

In an exemplary embodiment according to FIG. 6-2A, which leads to results similar to FIGS. 6-2 B and C, a flag (340) of straight configuration with an energy director (342) is welded to a flat base profile (242). The energy director of the flag was milled in and has a 60° point that protrudes about 0.8 mm out of a stop configured as a step. Both joining partners are produced of the material TECATHERM 66GF (PA66GF25) from Fa. Ensinger GmbH.

The welding is performed discontinuously by means of ultrasound at 20 kHz, the decoupling of the ultrasonic energy takes place according to FIG. 6-2 A through the base profile to the energy director and has 8.2 J/mm, standardized to the length of the welded on flag.

During the welding operation, the pressing force and the holding force K, respectively, (force direction: flag perpendicular to the base profile) was increased from 15.5 N/mm to 24.4 N/mm; here, too, a standardization of the force to the length of the flag is used.

After the solidification of the weld, the quality of the weld is examined. In the tensile test, a standardized strength of 39.8 N/mm (according to the structured outlined in FIG. 20) was determined. In the break pattern (not shown), one can clearly see the region of the fusion, melt ejection, and remainders of the contours of the energy director, as is also visible in the cross section of FIGS. 6-2 B and C.

FIG. 6-3 shows the procedure of materially bonding the first functional element 340 and the insulating bar 242 by means of ultrasound in an alternative arrangement of the sonotrode 388. In this method, a mount with two guide elements 392 is used for positioning the first functional element 340', and the sonotrode 388 of the ultrasound generator 386 is placed on the rim of the first functional element 340' that is opposite the thicker section 342'. Arranged on the opposite side of the first functional element 242 is a stop 394 or anvil, which applies the specified pressing force between the insulating bar 242 and the first functional element 340'.

Shown in FIG. 7 is a multiplicity of different embodiments of the insulating profile in accordance with the invention, wherein reference may first be made to the insulating profile 400, which corresponds substantially to the insulating profile of FIG. 1A. The insulating profile 400 here contains an insulating bar 402 with roll-in heads 404 formed on both opposing rims, which roll-in heads 404 here, unlike in FIG. 1A, are configured without the grooves 18. The insulating profile 400 has in addition to the insulating bar 402 a first functional element 406 which is materially bonded halfway up and which may serve, for example, to at least partially subdivide a cavity formed by the insulating profile 400 and two metal profiles connected by said insulating profile 400, and which may thus serve to reduce or even substantially completely suppress convection currents in said cavity (not shown).

Shown in FIG. 7 as a further embodiment is an insulating profile 420 in accordance with the invention, in which the insulating profile web is materially bonded about in the middle, i.e., halfway up, to a semi-circular first functional element 424. The first functional element 424 may serve to accommodate additional insulating bodies like, e.g., round foam profiles (not shown) or, similarly to the first functional element 406, serve to subdivide a cavity which is formed by the insulating profile 420 and metal profiles connected thereto (not shown). The embodiment shown results, among other things, in the advantage that two protruding flags are generated by means of one joint zone.

In the case of the insulating profile 440 in accordance with the invention, an embodiment is present in which the insulating bar 442 bears halfway up its overall height an approximately V-shaped first functional element 444 that is materially bonded thereto. The function of the first functional element 444 is similar to that of the first functional element 406 or of the functional element 424, i.e., subdividing a cavity into smaller cavities for suppressing the convection, which cavity is formed by the insulating profile 440 and metal-plastic composite profiles connected thereto (not shown).

In the further embodiment of an insulating profile 460 of FIG. 7, the insulating bar 462 is materially bonded to a first functional element 464, wherein the first functional element 464, together with the insulating bar 462, encloses a hollow chamber 466 that is trapezoidal in cross section. Here, too, for example when using said insulating profile 460 in a metal-plastic composite profile, the cavity formed is subdivided and, in particular, the volume of the chamber 466 is separated from the rest of the cavity, such that a heat transmission by means of convection is again reduced or largely suppressed to substantially completely suppressed.

Similarly constructed is the embodiment of an insulating profile 480, in accordance with the invention, of FIG. 7, in which an insulating bar 482 is materially bonded to a first functional element 484 which in turn is formed on the outer contour so as to be trapezoidal in cross section.

In comparison with the embodiment of the insulating profile 460, the insulating profile 480 has within a hollow chamber 486 a flag 490 which points from the middle part 488 of the first functional element into the interior of the chamber 486 and which, for one, suppresses a convection within the chamber 486 of the insulating profile 480 and, for another, in certain applications under certain circumstances, also serves as a support element which counteracts a deformation of the first functional element 484 under greater loads. The first functional element 484 may be formed from a sheet material, wherein a middle region is then doubled, i.e., folded back on itself, to form the flag 490. This therefore results, as shown in FIG. 7, in a wall thickness that is twice as great for the flag 490 as for the remaining regions of the first functional element 484.

In the embodiment of the insulating profile 500 of FIG. 7, provision is made for an assembly projection 506 to be formed halfway up on the insulating profile either as one piece with the insulating bar 502 or to be subsequently attached to the latter, preferably by material bond, to which insulating bar 502 the first functional element 504 may then be materially bonded. The first functional element 504 hereby comprises two parts, a first arm 510 and a second arm 512, which both are of angled configuration and are adapted in their shape and cross section to the various functions with which these arms 510, 512 may be assigned. By designing the arms differently, the modular system-based approach may be pursued here, too, in product design in order to alter flags in position and length. Because in this example the assembly projection protrudes from the base profile, the joining method has no influence on the mechanical properties of the base profile.

In the embodiment of an insulating bar 520 of FIG. 7, the insulating bar 522 is finally formed as one piece with three projections 524, 526, 528 which, as required, hold a first functional element 530 and optionally further functional elements.

Here, too, provision is made for the first functional element 530 to be materially bonded to the assembly projection that is here in the middle. All assembly projections (524, 526, 528) may be used flexibly as required, in order to achieve other profile geometries by way of the modular system-based approach.

Even if not explicitly mentioned in the preceding description of the insulating profiles 420, 440, 460, 480, 500 and 520 in accordance with the invention, the insulating bars 422, 442, 462, 482, 502 and 522 thereof may have a substantially planar base body or a base body with a more complex geometry, on which base body so-called roll-in heads are formed on one or—as shown—on both opposing rim sections, which roll-in heads—as also shown—may accommodate a groove for accommodating a so-called fusible wire, or which may also have a simpler structure, as is shown in the case of the roll-in heads 404 of the insulating bar 402 of the insulating profile 400.

Figure 8:
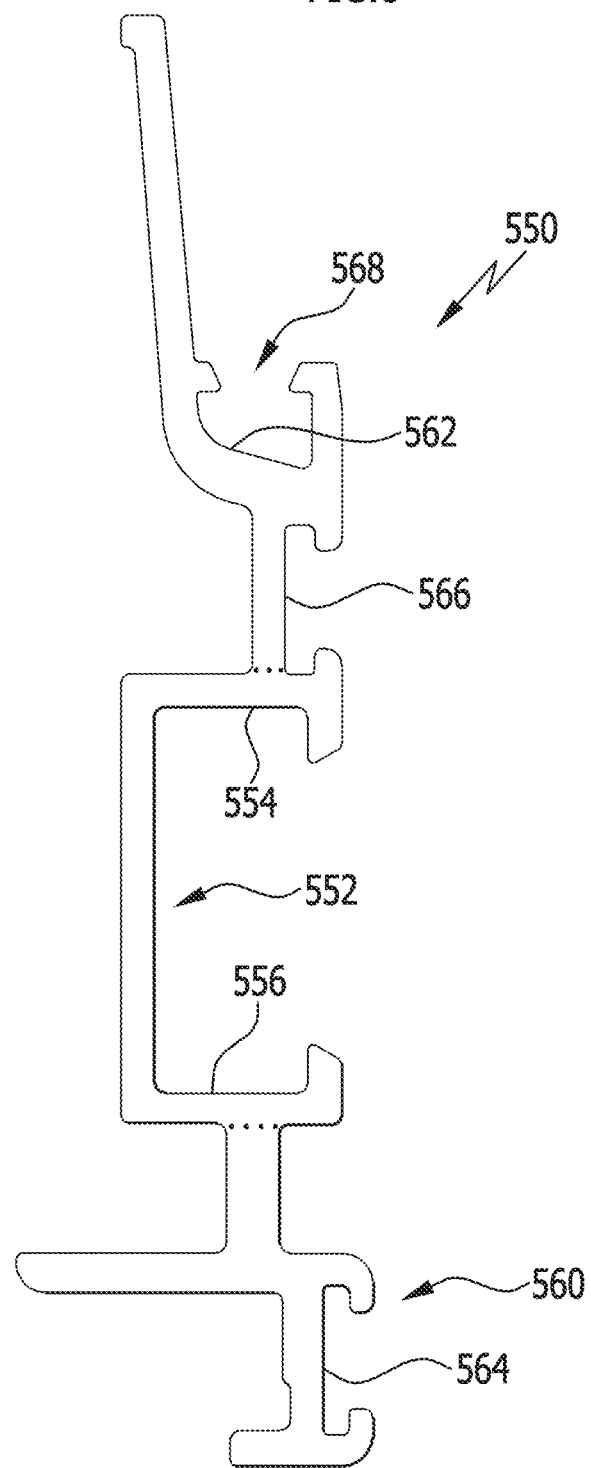
FIG. 8 shows a further embodiment of an insulating profile in accordance with the invention.

FIG. 8 shows an insulating profile 550 in accordance with the invention, which may serve the function of a so-called chicane. Such insulating profiles are used to function as sills, for example in sliding systems (large-format windows or doors).

The insulating profile 550 has an insulating bar 552 with rim sections 554, 556 which are each materially bonded to first functional elements 568, 560.

The functional elements 568, 560 may each individually provide additional functionalities for the insulating profile 550 like, for example, receiving grooves 562, 564 for accommodating sealing elements (the latter not shown) in a form-fitting manner, and/or together with parts of the insulating bar, forming functional regions like, for example the receiving groove 566 which may optionally also accommodate a sealing element in positive fit.

A dotted dividing line is added as a visual aid in FIG. 8 (in the following also in FIGS. 9A to 9D and FIGS. 10A to 10F) in a potential joint zone between base profile and functional element.

FIGS. 9A to 9D show an insulating profile in accordance with the invention, which is equipped on one side or on both sides with first functional elements, wherein the techniques used for material bonding may be different.

In the example of the insulating profile 600 which is shown as FIG. 9A, first functional elements 608, 610 may be applied with a material bond to the insulating bar 602, which is configured substantially as a planar strip, on a surface between the rim sections 604, 606.

The first functional elements 608, 610 have a hook shape, the projections of which in the assembled state are directed toward each other such that a receiving groove 612 for accommodating further functional elements (not shown) in a form-fitting manner forms between the first functional elements 608, 610.

In a modification of the insulating profile 600, first functional elements 608, 610, 614, 616 may, as is shown with the example of the insulating profile 600', also be materially mounted on both opposing surfaces of the insulating bar 602, such that in this embodiment receiving grooves 612, 612' are available on both sides.

The first functional elements 608, 610 and 614, 616, respectively, may be provided individually or in pairs and be materially bonded to the insulating bar 602, as is explained in the following on the basis of variants 9B to 9D.

In detail, FIG. 9B shows, with the example of an insulating profile 640 in accordance with the invention that is based on an insulating bar 642, the attachment of a first functional element 644 which has an assembly platform 646 and two hook-shaped projections 648, 650 thereon pointing away from the insulating bar 642, which projections 648, 650 are mutually aligned, in a way comparable to the first functional elements 608, 610, and thus form between them a receiving groove 652 for accommodating a further functional element (not shown) in a form-fitting manner. Formed on the assembly platform opposite to the hook-shaped projections 648, 650 are thicker sections 654, 656, which are configured tapering in cross section and which are deformed to contact zones 658, 660 when materially bonding the first functional element 644 to the insulating bar 642. Depending on the operating conditions, i.e., in particular input of energy and pressing force K and K' when ultrasonically welding, a partial (as shown) or full-area abutment of the assembly platform 646 against the surface of the insulating bar 642 may be achieved.

In FIG. 9C, an insulating profile 680 is formed of an insulating bar 682 and a first functional element 684 by means of material bonding. Here, too, the first functional element 684 contains an assembly platform 686 on which hook-shaped projections 688, 690 directed away from each other are held. Unlike in Variant B, the assembly platform has no thicker sections on the surface opposite the hook-shaped projections. The material bond of the insulating bar 682 and first functional element 684 is preferably carried out here by adhesion or welding. A pressing force K is thereby preferably being applied between the hook-shaped projections. In the case of welding, laser or ultrasonic welding being preferred here, the energy may also be introduced between the hook-shaped projections directly to the assembly platform, whereby a welding is then achieved about halfway up the assembly platform 686 toward the insulating bar 682.

Finally, FIG. 9D shows the production of an insulating profile 700, in accordance with the invention, from an insulating bar 702 and two hook-shaped first functional elements 704, 706, which, as in FIG. 9A described above, are attached separately by material bond on the same surface of the insulating bar 702. For this purpose, the first functional elements 704, 706, on the faces thereof that point toward the insulating bar, are configured with thicker sections 708, 710 which are triangular in cross section and are deformed to contact zones upon ultrasonic welding.

FIGS. 10A to 10F show a further number of variants of insulating profiles in accordance with the invention, in which the insulating bar is shaped differently and the first functional elements are shown with varying functionality.

In FIG. 10A, an insulating profile 720 in accordance with the invention has a substantially planar strip-shaped insulating bar 722 on which a first functional element 724 is mounted about halfway up the overall height by means of a material bond. The first functional element has a T-shape in cross section, wherein the segment 726 is materially bonded with its free end to the insulating bar 722 and bears at its other end the transverse segment 728. The segment 726 and the transverse segment 728 are typically made as one piece, for example extruded.

FIG. 10B shows an insulating profile 740 in accordance with the invention which is based on an insulating bar 742 and a first functional element 744. The insulating bar 742 has a planar middle part 746 and, adjoining the same on both sides, rim sections 748, 750 which are offset toward the same side and which are each equipped with a roll-in head.

In FIG. 10C, an insulating profile 760 in accordance with the invention is shown which consists of a planer insulating bar 762 and an arrow-shaped first functional element 764. The arrow tip 766 may be used as part of a latching connection to a further functional element (not shown) with which the functionality of the insulating profile 760 is further variable.

Represented in FIG. 10D is an insulating profile 780 in accordance with the invention, which comprises an insulating bar 782 with a planar first functional element 784 protruding perpendicularly therefrom. The insulating bar 782 itself is formed with a planar middle part 786 which is adjoined on both sides by rim sections 788, 790 that are offset toward the same side. The rim sections 788, 790 are, as in the other variants of FIG. 10, also configured with roll-in heads.

FIG. 10E relates to an insulating profile 800 in accordance with the invention with an insulating bar 802 and a first functional element 804 materially attached thereto. The insulating bar 800 is formed with a planar middle part 806 adjoined on both sides by rim sections 808, 810 offset toward the same side. The first functional element 804 has a T-shape in which the segment 812 is materially bonded with its free end to the insulating bar 802. The transverse segment 814 of the first functional element 804 is provided in the middle with a groove 816 that is triangular in cross section. In the assembled state of the insulating profile 800, the functional element may then, for example, accommodate suitably deigned elastic sealing profiles and reliably fix and hold the same in position by means of the T-function with a groove.

Depicted finally in FIG. 10F is an insulating profile 820 in accordance with the invention which, in addition to an insulating bar 822 and a first hook-shaped functional element 824, has two further functional elements 826, 828. The insulating bar 822 is configured with two rim sections 832, 834 offset toward the same side from a planar middle part 830. The two further functional elements 826, 828 are produced of a planar strip-shaped material and each are materially bonded with one of their rims to the insulating bar 822. The two further functional elements 826, 828 form a channel which, for example, may serve to accommodate a free rim of a first functional element of a further insulating profile in accordance with the invention (not shown). For this purpose, reference may be made, for example, to the insulating profile 20 in accordance with the invention and the first functional element 30 thereof.

A further embodiment of an insulating profile 840 in accordance with the invention is shown in FIG. 11. The insulating profile 840 comprises an insulating bar 842 and two first functional elements 844, 846 materially bonded thereto.

The insulating bar 842 comprises a planar middle part 848 and, adjoining the same on both sides, rim sections 850, 852 which are offset toward a side of the insulating bar 842 in relation to the middle part 848. On the opposite side, the first functional elements 844, 846 are materially bonded to the insulating bar 842. The first functional element 844 is of T-shaped configuration, the first functional element 846 being hook-shaped. The two first functional elements 844, 846 together form a receiving groove 854 into which, for example, a sealing element (not shown) may be inserted in a form-fitting manner.

FIG. 12 shows a further embodiment of an insulating profile 870 in accordance with the invention. The insulating profile 870 has an insulating bar 872 with a planar middle part 874 and rim regions 876, 878 adjoining the latter, which are offset toward a side of the insulating bar 872. On the opposite side, the insulating bar 872 has a first U-shaped functional element 880 which is materially bonded with the two free ends 882, 884 to the middle part 874 of the insulating bar 872 and thereby forms a hollow chamber 886 which is closed off from the environment.

FIG. 13 shows in a three-dimensional and a sectional view a further embodiment of an insulating profile 900 in accordance with the invention. The insulating profile 900 consists of an insulating bar 902 and a first functional element 904.

The insulating bar 902 comprises a planar, strip-shaped base body 906 adjoined on both opposing rims by rim sections 908, 910. The base body has through openings 912 at regular distances along its longitudinal direction, which through openings 912 extend transversely to the longitudinal direction of the insulating profile 900 over substantially the entire width of the base body 906 of the insulating bar 902 and are separated from each other by way of webs 914. The heat transmission through the insulating profile 900 may thereby be significantly reduced.

The first functional element 904 is configured to be tub-shaped in cross section, wherein one or both of the free rims 916, 918 is/are materially bonded to the insulating bar 902. The tub-shaped first functional element 904 of the insulating profile 900 extends in its transverse direction over the entire width of the base body 906 and is materially bonded with its free rims 916, 918 to the rim sections 908 and 910, respectively.

Figure 14:
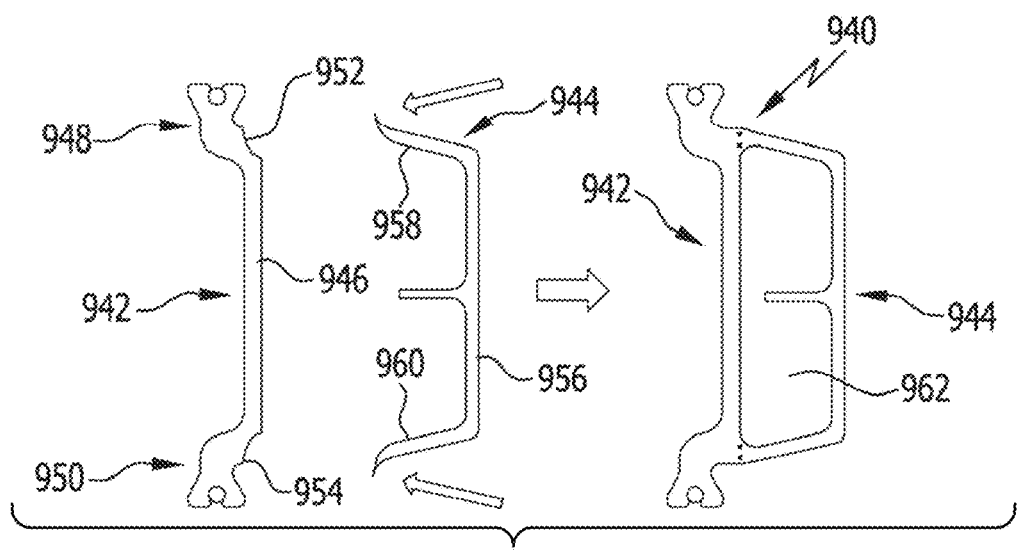

FIG. 14 shows a further example of an embodiment in accordance with the invention of an insulating profile 940 and the way of its production.

The insulating profile 940 is produced of an insulating bar 942 and a first functional element 944, wherein the insulating bar 942 comprises a planar middle part 946 and rim sections 948, 950 which a formed thereon and are configured offset toward a side of the middle part 946. On the opposite side, indentations 952, 954 are provided in the rim sections 948, 950.

The first functional element 944 has in cross section substantially a U-shape with a transverse wall 956 and two side walls 958, 960. The free ends of the side walls 958, 960 are tapered and adapted in their shape to the indentations 952 and 954, respectively, of the insulating bar 942. In materially bonding the free ends of the side walls 958, 960 of the first functional element 944 and the insulating bar 942, a largely stepless transition at the outer contour of the insulating profile 940 may thus be achieved.

A hollow chamber 962 is formed with the material bond of the insulating bar 942 to the first functional element 944. Said hollow chamber 962 may be subdivided as required by a web-shaped projection 964, which protrudes from the transverse wall 956 substantially in parallel to the side walls 958, 960, in order to suppress convection currents in the cavity 962 which might be expected.

Figure 15:
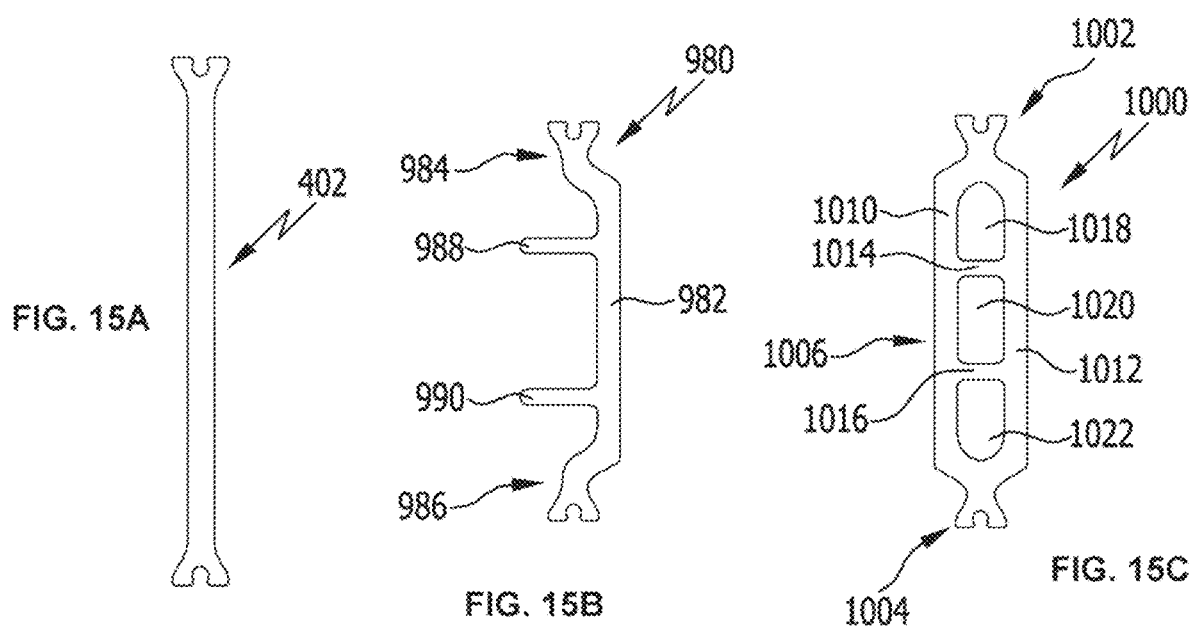
FIGS. 15A to 15C show three variants of insulating bars for the production of insulating profiles in accordance with the invention.

FIGS. 15A to 15C show in comparison three examples for insulating bars on which the manufacture of insulating profiles in accordance with the invention may be based.

FIG. 15A corresponds to the insulating bar 402 as it is used in the manufacture of the insulating profile 400 (see FIG. 7).

FIG. 15B shows that, in accordance with the invention, significantly more complexly structured insulating bars may also be used. The insulating bar 980 has a strip-shaped planar middle part 982 which is adjoined on both opposing rims by rim sections 984, 986 that are configured offset in relation to the middle part 982.

The middle part 982 has on the side of the offset rim sections 984, 986 two perpendicularly protruding projections 988, 990, which, in this example, are produced, in particular extruded, as one piece together with the middle part 982 and the rim sections 984, 986 in an extrusion step.

In FIG. 15C, an insulating bar 1000 is shown which is configured as hollow profile. The hollow profile may comprise one or a plurality of hollow chambers; in the present example there are three. The insulating bar 1000 has on two opposing ends rim sections 1002, 1004 which are configured as roll-in heads. The base body 1006 of the insulating bar 1000 is formed of two walls 1010, 1012 which run substantially in parallel and which enclose a cavity that is subdivided into three hollow chambers 1018, 1020, 1022 by way of two transverse webs 1014, 1016. Even this relatively complexly structured insulating bar 1000 may be formed as one piece, in particular extruded.

FIG. 16 shows a further embodiment for an insulating profile 1040 in accordance with the invention which is designed as a hollow chamber profile.

The insulating profile consists of two planar insulating bars 1042, 1044 and two planar first functional elements 1046, 1048. The material bond of the insulating bars 1042, 1044 to the first functional elements 1046, 1048 may take place in different ways.

FIG. 16 shows one of the possible variants, in accordance with which the two first functional elements 1046, 1048, aligned in parallel to each other, are first materially bonded to one of the two insulating bars, namely the insulating bar 1044 and, in a subsequent step, to the further insulating bar 1042, a hollow chamber 1050 then being formed. In the first step, not only can a simultaneous material bonding of the first functional elements 1046, 1048 to the one insulating bar 1044 take place, but also a successive connecting of the two functional elements 1046, 1048 may be economically sensible.

Alternatively, it is further conceivable that the insulating profile 1040 is produced in such a way that, in a first step, each of the insulating bars 1042, 1044 is individually materially bonded to one of the first functional elements 1046, 1048 and then a material bond of said insulating bar/functional element composites to each other is effected to form an insulating profile 1040.

FIG. 17 shows a complex embodiment of an insulating profile 1060 in accordance with the invention, as well as the manufacture thereof. The insulating profile 1060 comprises an insulating bar 1062 with a substantially planar profile or base body 1064, on both rims of which rim sections 1066, 1068 are formed, which each have a roll-in head. One of the rim sections 1066 is offset in relation to the base body 1064, while the other rim section 1068 extends substantially along an axis of symmetry of the base body 1064.

A profile which is formed W-shaped in cross section and which is materially bonded with both its side walls 1072, 1074 and a middle wall 1076 to the base body 1070 and to the rim sections 1066, 1068, respectively, is used as the first functional element 1070. Two hollow chambers 1078, 1080 which are completely separated from each other are thereby formed.

In a further manufacturing step, two further functional elements 1082, 1084 which are substantially L-shaped in cross section are materially connected to the insulating bar 1064 and the base body thereof 1064, respectively.

FIG. 18A shows a section of a conventional insulating profile 1100 in cross section, which was produced by means of classic extrusion. The insulating profile 1100 has an insulating bar 1102 and a functional element, formed thereon, in the form of a perpendicularly protruding flag 1104. Typical for insulating profiles 1100 produced as one piece in the extrusion process is the transition region from the insulating bar 1102 to the functional element 1104 with radii 1106, 1108 of about 0.1 mm or more.

The transition region of an insulating profile 1120 in accordance with the invention, according to FIG. 18B, however, with an ideally formed connecting zone between the insulating bar 1122 and the first functional element 1124, is configured as a clear abutting edge 1126, 1128.

In less ideal, but still fully functional transition regions, a structure differing from the abutting edge shown in FIG. 18B is obtained, as is shown in the examples of FIGS. 18C and 18D. A visual or microscopic evaluation of this structure makes it possible to easily determine whether they are insulating profiles in accordance with the invention. In the case of such an inquiry, for example a micrograph of an insulating profile cross section (after embedding in a support medium) may be produced in order to draw conclusions regarding the joining method, material combinations, or the use of auxiliary materials. Profiles in accordance with the invention have structures which result from a material joining process and which are not able to be produced in a one-step manufacturing process (e.g., extrusion). Some of these structures are schematically depicted in FIG. 18 C or FIG. 18 D or FIG. 19. Mention should be made in particular of fine hairline gaps (1146, 1148) or ejection of auxiliary material or ejection of melt (1166, 1168), which can give an indication of a joining method in accordance with the invention.

In FIG. 18C, an insulating profile 1140 in accordance with the invention has a transition region between the insulating bar 1142 and the first functional element materially bonded thereto, which contains a notch 1146, 1148 or hairline gap on both sides of the first functional element 1144. If a greater input of energy and/or a higher pressure (force K) is used in the method for materially bonding the insulating bar 1142 and first functional element 1144, the notches 1146, 1148 may be significantly reduced and, in an ideal situation, abutting edges may be achieved, as they are shown in FIG. 18B. It is also possible for a hairline gap to form when working with auxiliary materials.

In FIG. 18D, an insulating profile 1160 in accordance with the invention has a transition region between the insulating bar 1162 and the first functional element 1164, which transition region upon the material bonding thereof includes a material or melt ejection 1166, 1168, as was already similarly shown and discussed in the context of the illustrations FIGS. 6-2B and 6-2C.

An insulating profile 1200 in accordance with the invention is shown in FIG. 19, in which an insulating bar 1202 becomes or is materially bonded to a first functional element 1204. The rim 1206 of the first functional element 1204 that is to be connected to the insulating bar is configured with an optimized structure in which the thicker section 1208 that is triangular in cross section is enclosed on both sides by projections 1210, 1212 extending in parallel, in such a way that a notch 1214, 1216 or a gap remains on the base of the thicker section 1208 between the same and the projections 1210, 1212, which notch 1214, 1216 is able to accommodate melt ejection in the case of a deformation of the polymer material of the thicker section while forming a contact zone 1220 between the insulating bar 1202 and the first functional element 1204. The residual volumes 1222, 1224 of the notches 1214, 1216 can only be seen in cross section, such that a visually smooth abutting edge 1226, 1228—as is schematically shown in FIG. 18B—is achievable with reasonable effort. This concept may of course be transferred to the diverse joining methods stated above. The production of the contoured structure of the rim 1206 with a thicker section 1208 and optionally with notches 1214, 1216 may take place, e.g., by way of a milling process, should other methods (for example extrusion) not be appropriate or expedient.

It has already been pointed out in the context of the description of different embodiments of the insulating profiles in accordance with the invention that the contact zone which is formed by the material bond of the insulating bar and first functional element may be configured in different sizes depending on the application or purpose of the insulating profiles in accordance with the invention. In any case, it is important hereby that adequate mechanical rigidity of the connection between the insulating bar and the first functional element be obtained so that the insulating profile in accordance with the invention can be handled and processed securely.

Figure 20:
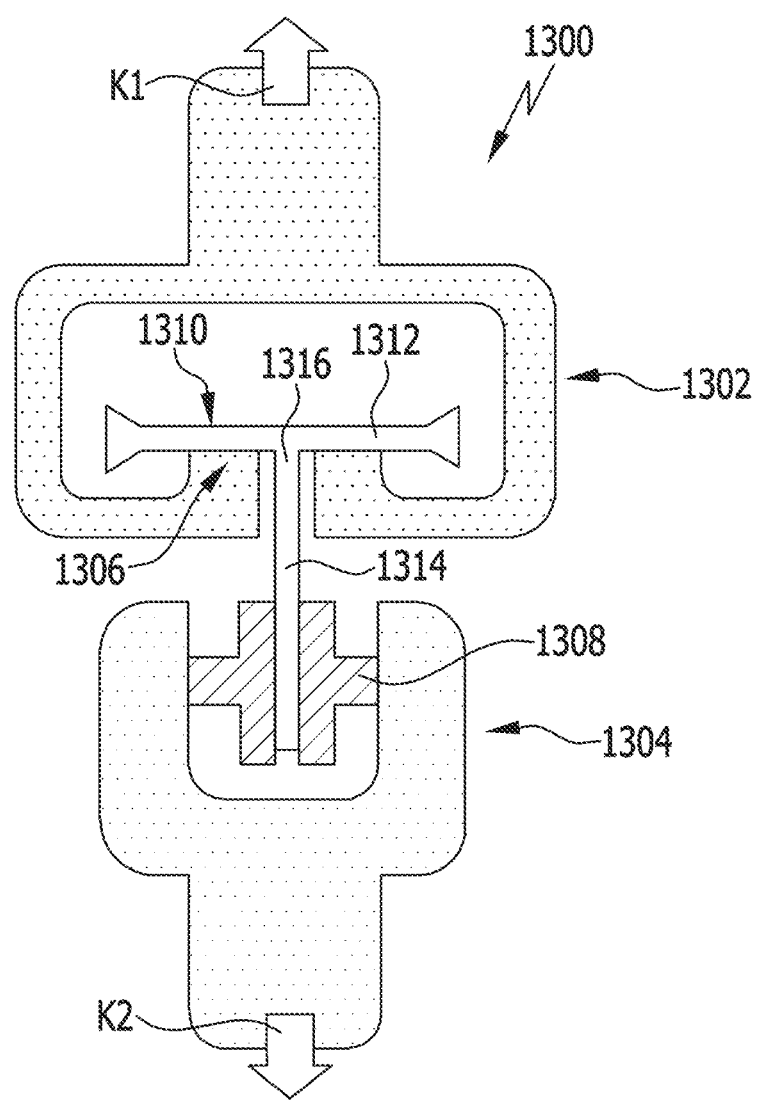
FIG. 20 shows a variant of a testing device for insulating profiles for determining the strength of a functional element attached in accordance with the invention.

A test that is to be described in more detail in the scope of FIG. 20 is suitable for characterizing the strength of the connection and the concomitant mechanical load capacity.

FIG. 20 shows a testing device 1300 which can be used in a conventional universal testing machine for determining tensile load limits of components.

The exemplary testing device 1300 is designed for simple profiles with perpendicularly protruding flags, in this case in a test a tensile force is applied to the flag perpendicularly to the profile body. It is also possible, however, to design testing devices for other profile geometries and optionally to also consider other directions of action for the introduction of force, provided this is expedient for obtaining information on the joint zone and the quality of the connection of the joining partners.

The testing device 1300 comprises an upper test body receptacle 1302 and a lower test piece seating 1304. In the upper test piece seating 1302, a two-part test body support 1306 is formed, on which an insulating profile 1310 in accordance with the invention (for example in the form of an insulating profile, carefully cut to length, as the test body with a length of 20 mm to 50 mm) may be placed with its insulating bar 1312, wherein the first functional element 1314 thereof is able to pass through a gap between the two parts of the test body support 1306.

The lower test piece seating 1304 comprises a pair of clamping jaws 1308 in which a section of the first functional element 1314 can be clamped.

In the tensile test, a force in the direction of the arrows K1 and K2 is exerted on the joint or contact zone 1316 of the insulating profile 1310, which force is continuously increased until a tear of the first functional element from the insulating bar 1314 takes places. The parameters of the tensile test may be adapted in order to obtain meaningful results regarding the materials. This tensile test is typically carried out at a speed of 1 mm/min, 5 mm/min or 10 mm/min. The determined force until failure of the test body is then standardized to the length of the sample body of the insulating profile. It must be ensured here that when measuring, the joint zone to be examined is loaded over the whole area and in a sensible direction, e.g., with normal force. Insulating profiles in accordance with the invention then have strengths of about 2 N/mm or more, preferably about 5 N/mm or more, particularly preferably about 10 N/mm or more.

FIGS. 21A to 21D schematically show a method sequence for materially bonding an insulating bar 1350 to a first functional element 1352 in a production facility (only shown in parts). The insulating bar 1350 has a planar profile body 1354 and rim sections, formed thereon on both sides, in the form of roll-in projections 1356. The functional element 1352 has a U-shaped cross section with a receiving groove 1358 which is delimited on both sides in each case by a projection 1360. The projections 1360 have on the free ends thereof in each case a latching projection 1362 pointing to the inside of the groove. The functional element 1352 has on its lower base surface 1364 three thicker sections 1366 running in the longitudinal direction of the functional element 1352.

In the case of the method shown in FIGS. 21A to 21D, it is a variant of a continuous in-line process, the depiction in FIGS. 21A to 21D is with a view in the feed direction. Not shown is the conveyor technology which precisely guides and conveys the insulating bar 1350 and the functional element 1352, or other typical process technology known to the person skilled in the art.

Shown in FIG. 21A is the step of irradiating and heating contact surfaces of the insulating bar 1350 and the functional element 1352 by means of infrared radiation. The functional element 1352 as one of the joining partners is here a U-shaped profile. On the downwardly pointing base surface 1364, the three thicker sections 1366 form a potential joint zone.

The insulating bar 1350 with two simple roll-in projections 1356 functions as a further joining partner.

In the method, two separate radiation sources 1370, 1372 are used (here: directed infrared radiation sources), the radiation 1374, 1376 of which is aligned to the respective potential joint zone) 1380, 1382.

In a following step, depicted in FIG. 21B, the radiation sources 1370, 1372 are removed and the heated joining partners (insulating bar 1350 and functional element 1352) are placed in the relative position specified for joining. Said relative position is set geometrically by guide elements 1386 (here in the form of rollers) which laterally guide the functional element 1352.

The joining partners are brought into contact by applying a pressing force $F_A$. The pressing force $F_A$ is metered by way of a pressing roller 1388 traveling in the feed direction. The functional element 1352 is thereby pressed against the upper side of the insulating bar, whereby the plasticized melt begins to flow in the heated joint zone and forms a fusion region 1392. A stop element 1390 (here in the form of a roller) placed opposite the pressing roller 1388 supports and holds the insulating bar 1350 in position and prevents a shift in the pressing direction (downward in the drawing) under the pressing force. The pressing may optionally also take place with a plurality of rollers (not shown).

The volume present between the thicker sections 1366 may serve in the joint zone (fusion region 1392) to accommodate plasticized material or melt ejection.

After completely forming the fusion region 1392, the joining partners, while a holding force $F_H$ continues to act on the joining partners, are further fixed relative to each other until the melt in the fusion region 1392 has solidified and no more undesired deformation or displacement of the joining partners may occur (FIG. 21C). During the holding, the previously plasticized region of the joint zone solidifies and thus results in a material bond in the form of a fixed weld.

The required holding time may thereby last, depending on the combination of materials, process parameters, and geometry of the joint location, from a few ms to multiple s and may be controlled, e.g., by the number and configuration of pressing rollers 1388, 1390.

An insulating profile in accordance with the invention obtained by means of this method is shown in cross section in FIG. 21D.

Figure 22:
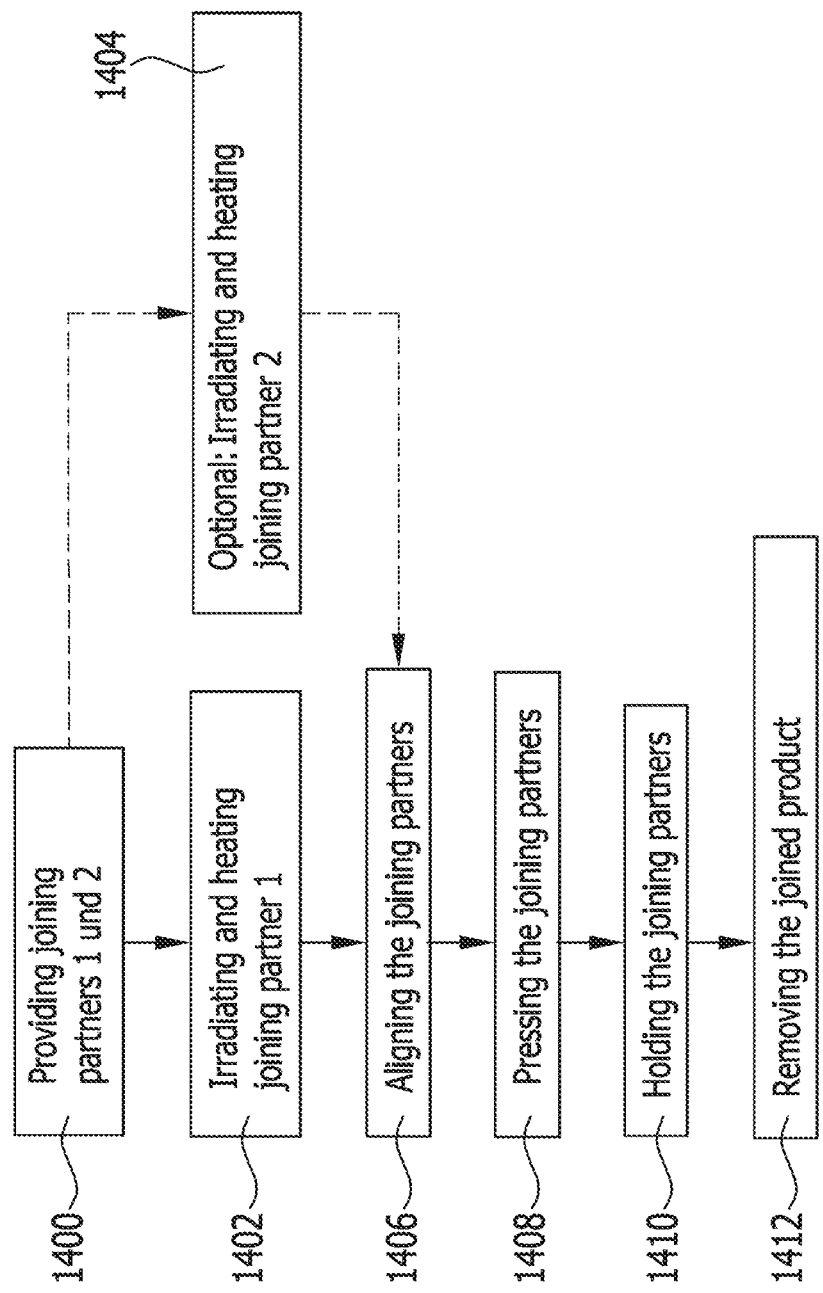
FIG. 22 shows a schematically represented process sequence of a method for producing insulating profiles in accordance with the invention.

The process sequence laid out in the context of the description of FIGS. 21A to 21D with the example of infrared welding is depicted again in FIG. 22 in a diagram.

First the joining partners are provided in a state, an alignment, and quantity (step 1400) so that the method may be performed. Then, in a following step 1402/1404 one or both joining partners are heated by irradiating with infrared radiation. Then the joining partners are properly aligned relative to each other in step 1406 before they are pressed against each other with their joint zones in step 1408. After pressing, the joining partners in step 1410 are held in a predetermined relative position until the connection forming in the fusion region has hardened (e.g., solidified by cooling). After the material bonding has taken place, the joined product (insulating profile) may be removed from the production line in step 1412.

In all the rim sections used in the Figures described above that are provided with roll-in heads, roll-in heads of identical design are shown in the case of both rim sections. This does in fact correspond to the structure used in the majority of insulating profiles in accordance with the invention, but is not in any way compulsory. It is thus conceivable in accordance with the invention, for one, to equip an insulating profile with only one rim section, which then may optionally be fitted with a roll-in head, or, for another, to equip each rim section with a different geometry, optionally also with two differently formed roll-in heads.

Rolling-in is in principle the most common method for connecting plastic insulating profiles to metal profiles, but in addition there are also other methods like, for example, adhesively bonding insulating profiles in metal profiles. These connecting methods for composite profiles are also achievable with the described insulating profiles in accordance with the invention.

In many of the embodiments of insulating profiles in accordance with the invention, strip-shaped planar, so-called flags are used as first functional elements. While this kind of first functional elements is used in a variety of ways, they may, however, as required, be exchanged for significantly more complexly structured first functional elements, which are also shown for example in FIGS. 6-1A to 6-1C and 7, among others.

Likewise, the base profile itself may already be as complex as desired. Many previously known profile geometries from the prior art, in particular profiles which have already been commercialized, may serve as a base to be equipped with further functional elements according to the method in accordance with the invention.

Various examples of such further insulating profiles are presented in the context of FIGS. 23 to 25, which relate to insulating profiles, in accordance with the invention, in the form of so-called facade spacers.

FIGS. 23A to 23C show a first facade spacer 1450 with an insulating bar 1452 of meandering configuration, which has on an end of its profile body 1456 a rim section in the form of an anchoring projection 1454. The insulating bar 1452 is typically made in one-part manner in an extrusion step and may, within the scope of the present invention, be provided with one or a plurality of functional elements. In the example of FIGS. 23A to 23C, a U-shaped holding profile 1458 is used as a functional element, which is configured similarly to the holding element 1362, such that reference may be made to the more detailed description thereof.

Analogously to the method described in the context of FIGS. 21A to 21D and 22, the holding element 1458, which may, for example, accommodate and fix sealing lips, may be materially secured to the profile body 1456 of the insulating bar at one or a plurality of positions, such that it results in an insulating profile as shown in FIGS. 23B and 23C. Of course the functional elements (here the holding profiles) may be placed not only on one side of the facade spacer, but also on opposite sides and be materially bonded to the insulating bar or profile body.

Another example of a facade spacer is shown in FIGS. 24A and 24B. Here an insulating bar 1470 is formed with a profile body 1472 and a rim section 1474 which is shaped onto the profile body 1472 and which, in turn, is configured as an anchoring projection, equipped with one or a plurality of functional elements 1476 which in the present example are configured as arrow-shaped anchoring projections. These functional elements 1476, too, may be used to mount sealing strips or other components for modifying the functionality of the facade spacer 1480. Here, too, the functional elements may be placed and fastened at different positions, even on sides of the insulating bar or profile body that face away from each other.

Three further variants of facade spacers are shown in FIGS. 25A to 25D, in which, starting from an insulating bar 1500 shown in FIG. 25A, having a profile body 1502 and a rim section 1504 shaped thereon which serves as an anchoring projection, different functional elements 1510, 1512, 1514 are connected to the profile body in order to achieve the desired functionality of the facade spacers 1520, 1522, 1524, which each are shown in FIGS. 25B to 25D.

The facade spacer 1520 shown in FIG. 25B may thus be fitted with sealing elements (not shown) by way of the functional elements. The facade spacer 1522 shown in FIG. 25C has flags protruding from the profile body 1502, which flags serve to reduce convection in a cavity that is adjacent in the assembled state, and which thus further improve the heat insulation. In the case of the facade spacer 1524 lastly shown in FIG. 25D, the functional element 1514 serves to accommodate a sealing strip (not shown), whereby the heat insulation characteristics of the facade construction may also be further improved.

Unlike in FIGS. 23A to 23C and 24A and 24B, the profile body in these embodiments of FIGS. 25A to 25D is not of meandering configuration, but rather is configured as a hollow profile which is closed in cross section.

The invention claimed is:

1. An insulating profile, wherein the insulating profile comprises a polymeric insulating bar having at least one profile body extending in a longitudinal direction of the insulating profile, and at least one rim section formed onto the at least one profile body, and, one or more polymeric first functional elements, each of the one or more polymeric first functional elements being made separately than, and subsequently connected to, the polymeric insulating bar, wherein each of the one or more polymeric first elements are materially bonded with a strength of at least 2 N per mm length of the at least one profile body measured in a tensile strength test to the at least one profile body of the insulating bar and/or to the at least one rim section; wherein each of the one or more polymeric first functional elements has a wall thickness of 0.6 mm or more, and an E-modulus of 2000 MPa or more.

2. The insulating profile in accordance with claim 1, wherein the at least one profile body has a region which extends in the longitudinal direction of the insulating profile and is of substantially planar configuration.

3. The insulating profile in accordance with claim 1, wherein the at least one profile body has through openings at predetermined distances.

4. The insulating profile in accordance with claim 1, wherein the at least one rim section is configured having a connecting element.

5. The insulating profile according to claim 4, wherein the connecting element is a roll-in head.

6. The insulating profile in accordance with claim 1, wherein the material bond is produced using an auxiliary material.

7. The insulating profile in accordance with claim 6, wherein the auxiliary material has a softening temperature and/or a processing temperature of 95° C. or more.

8. The insulating profile in accordance with claim 1, wherein the insulating bar further comprises one or more polymeric second functional elements which are integrally formed with the at least one profile body, wherein each of the one or more polymeric second functional elements has a wall thickness of 0.6 mm or more, an E-modulus of 2000 MPa or more.

9. The insulating profile in accordance with claim 1, wherein the one or more polymeric first functional elements are selected from elements of planar and/or arcuate configuration and/or elements enclosing one or a plurality of cavities.

10. The insulating profile in accordance with claim 1, wherein the one or more polymeric first functional-elements form a multiplicity of, optionally closed, cavities in the longitudinal direction of the insulating profile.

11. The insulating profile in accordance with claim 1, wherein the one or more polymeric first functional elements, seen in the longitudinal direction of the insulating profile, have adjoining wall sections which are angled to each other and are aligned.

12. The insulating profile in accordance with claim 1, wherein the one or more polymeric first functional elements include a metallic material.

13. The insulating profile in accordance with claim 1, wherein a surface and/or a core of the one or more polymeric first functional elements is entirely or partially metal-coated or metallized or metallically treated.

14. A method for producing the insulating profile of claim 1, wherein first the at least one profile body having at least one rim section formed onto the at least one profile body is made as one piece with the at least one rim section, and the one or more polymeric first functional elements are made separately than the at least one profile body, and wherein subsequently, the at least one profile body and/or the at least one rim section is materially bonded by ultrasonic welding to the one or more first functional-elements with a strength of at least 2 N per mm length of the at least one profile body measured in a tensile strength test.

15. The method in accordance with claim 14, wherein the material bond of the one or more polymeric first functional elements to the at least one profile body and/or to the at least one rim section is produced by welding.

16. The method in accordance with claim 14, wherein the material bond of the one or more polymeric first functional elements to the at least one profile body and/or the at least one rim section is produced by adhesion.

17. The method in accordance with claim 14, wherein the material bond between the one or more polymeric first functional elements and the at least one profile body and/or the at least one rim section takes place continuously, in sections, or at points along the longitudinal direction of the insulating profile.

* * * * *